United States Patent
Tokuchi

(10) Patent No.: US 10,728,183 B2
(45) Date of Patent: Jul. 28, 2020

(54) INFORMATION PROCESSING APPARATUS AND NON-TRANSITORY COMPUTER READABLE MEDIUM STORING PROGRAM

(71) Applicant: FUJI XEROX CO., LTD., Tokyo (JP)

(72) Inventor: Kengo Tokuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/048,309

(22) Filed: Jul. 29, 2018

(65) Prior Publication Data

US 2019/0245813 A1 Aug. 8, 2019

(30) Foreign Application Priority Data

Feb. 2, 2018 (JP) .................................. 2018-017698

(51) Int. Cl.
| | |
|---|---|
| *G06F 9/451* | (2018.01) |
| *H04L 12/58* | (2006.01) |
| *G06N 5/02* | (2006.01) |
| *G06Q 10/00* | (2012.01) |
| *H04M 1/725* | (2006.01) |
| *G06F 3/16* | (2006.01) |

(52) U.S. Cl.
CPC .............. *H04L 51/02* (2013.01); *G06F 9/453* (2018.02); *G06N 5/02* (2013.01); *G06Q 10/00* (2013.01); *H04L 51/063* (2013.01); *G06F 3/167* (2013.01); *H04L 51/32* (2013.01); *H04M 1/72566* (2013.01)

(58) Field of Classification Search
CPC .................................. G06F 9/453; G06F 3/167
See application file for complete search history.

(56) References Cited

U.S. PATENT DOCUMENTS

| | | | |
|---|---|---|---|
| 2007/0156805 A1 | 7/2007 | Bristol et al. | |
| 2011/0078228 A1 | 3/2011 | Bristol et al. | |
| 2016/0170390 A1* | 6/2016 | Xie | G05B 15/02 700/19 |
| 2017/0189784 A1* | 7/2017 | Sasaki | A63B 71/06 |
| 2017/0262445 A1* | 9/2017 | Jeon | H04L 67/306 |
| 2018/0048722 A1* | 2/2018 | Fadeev | H04L 67/22 |
| 2018/0357306 A1* | 12/2018 | Osotio | G06K 9/00335 |

FOREIGN PATENT DOCUMENTS

JP 2009522687 6/2009

\* cited by examiner

*Primary Examiner* — David E Choi
(74) *Attorney, Agent, or Firm* — JCIPRNET

(57) ABSTRACT

An information processing apparatus includes a control unit that controls execution of processes corresponding to a comparison result between content and registered content, and the content.

20 Claims, 15 Drawing Sheets

FIG. 4

⟨ REGISTRATION TABLE ⟩

| FILE NAME | CONTENT OF FILE | CONTENT OF PROCESS |
|---|---|---|
| MATERIAL TRANSACTION CONTRACT | · X: XXX CORPORATION<br>· Y: YYY CO., LTD.<br>· PURPOSE: ****<br>· ******* | (1) EXTRACT DIFFERENCE AND SEND NOTIFICATION OF CHANGED PORTION<br>(2) SEND NOTIFICATION OF ADVANTAGE AND DISADVANTAGE DUE TO CHANGE |
| ACCOUNT BOOK | ... | (1) OVERWRITE CONTENT OF ACCOUNT BOOK FOR UPDATE |
| ACCOUNT BOOK + RECEIPT | ... | (1) ADD CONTENT OF RECEIPT TO ACCOUNT BOOK, AND SEND NOTIFICATION OF RESULT OF INTEGRATING FEES<br>(2) ADD CONTENT OF RECEIPT TO ACCOUNT BOOK, AND UPDATE DATABASE |
| SOFTWARE LICENSE CONTRACT | ... | (1) SEND NOTIFICATION OF RESTRICTIONS ON USER OR FEE TO BE CHARGED IN A CASE OF USING SOFTWARE |
| ... | ... | ... |

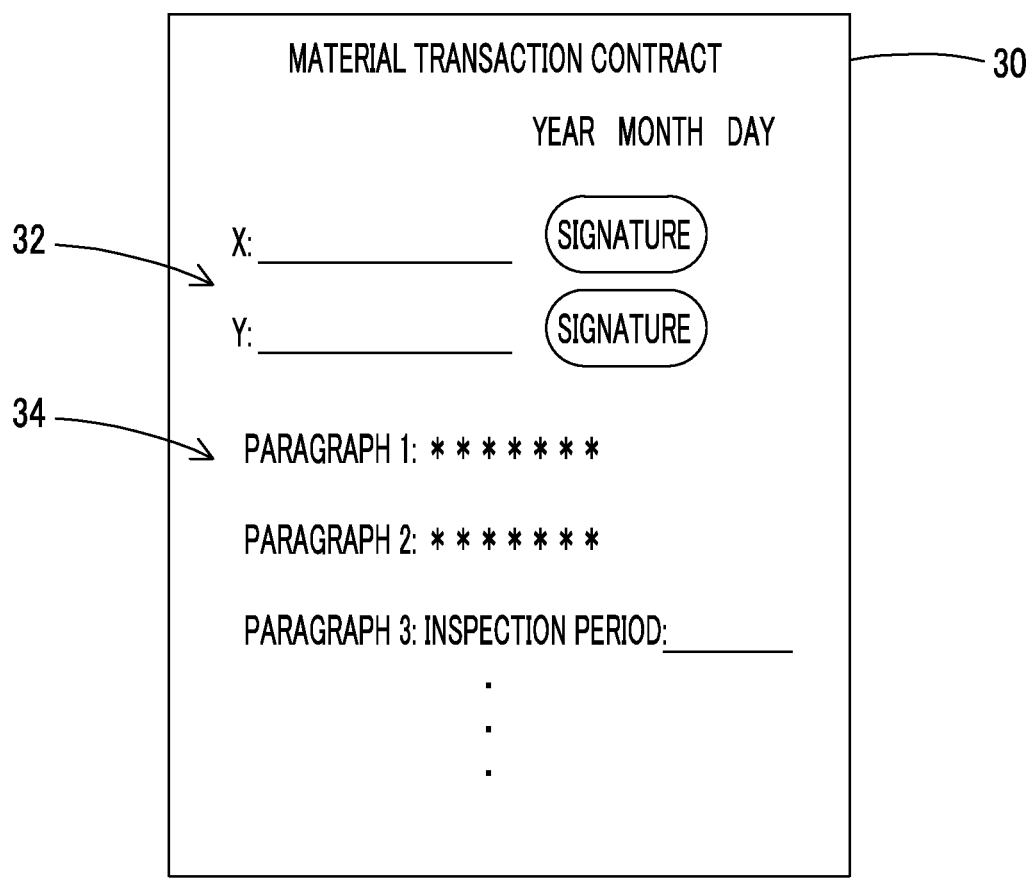

| ITEM | AMOUNT OF MONEY | DATE | ... |
|---|---|---|---|
| A | 1,000 YEN | DECEMBER 1, 2017 | ... |
| B | 2,000 YEN | DECEMBER 2, 2017 | ... |
|  |  |  |  |
|  |  |  |  |

| ITEM | AMOUNT OF MONEY | DATE | ... |
|---|---|---|---|
| A | 1,000 YEN | DECEMBER 1, 2017 | ... |
| B | 2,000 YEN | DECEMBER 2, 2017 | ... |
| C | 3,000 YEN | DECEMBER 3, 2017 | ... |
|  |  |  |  |

FIG. 13

| ITEM | AMOUNT OF MONEY | DATE | ... |
|---|---|---|---|
| A | 1,000 YEN | DECEMBER 1, 2017 | ... |
| B | 2,000 YEN | DECEMBER 2, 2017 | ... |
|  |  |  |  |
|  |  |  |  |

70

RECEIPT
ITEM: C
AMOUNT OF
MONEY: 3,000 YEN
DATE: DECEMBER 3,
2017

74

INFORMATION PROCESSING APPARATUS AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-017698 filed Feb. 2, 2018.

BACKGROUND

(i) Technical Field

The present invention relates to an information processing apparatus and a non-transitory computer readable medium storing a program.

(ii) Background Art

JP2009-522687A discloses a technique in which communication is estimated between one or more bots, and interaction with a device is performed through the one or more bots.

SUMMARY

Aspects of non-limiting embodiments of the present disclosure relate to an information processing apparatus and a non-transitory computer readable medium storing a program that perform processes corresponding to a comparison result between content and registered content.

Aspects of certain non-limiting embodiments of the present disclosure overcome the above disadvantages and other disadvantages not described above. However, aspects of the non-limiting embodiments are not required to overcome the disadvantages described above, and aspects of the non-limiting embodiments of the present disclosure may not overcome any of the problems described above.

According to an aspect of the present disclosure, there is provided an information processing apparatus including a control unit that controls execution of processes corresponding to a comparison result between content and registered content, and the content.

BRIEF DESCRIPTION OF THE DRAWINGS

Exemplary embodiment(s) of the present invention will be described in detail based on the following figures, wherein:

FIG. 4 is a diagram illustrating a registration table;
FIG. 5 is a diagram illustrating a template of a material transaction contract;
FIG. 13 is a diagram illustrating an account book.

DETAILED DESCRIPTION

Figure 1:
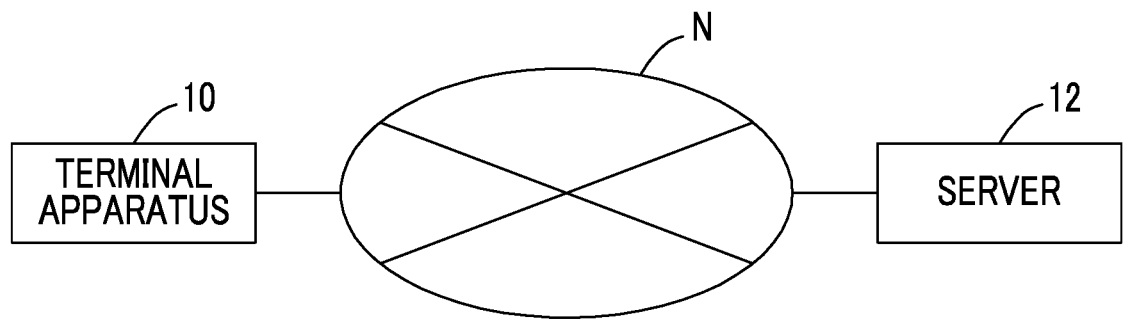
FIG. 1 is a block diagram illustrating a configuration of an information processing system according to an exemplary embodiment of the invention.

With reference to FIG. 1, a description will be made of an information processing system according to an exemplary embodiment of the invention. FIG. 1 illustrates an example of an information processing system according to the present exemplary embodiment.

The information processing system according to the present exemplary embodiment includes a terminal apparatus 10 and a server 12 as an example. For example, the terminal apparatus 10 and the server 12 have a function of performing communication with other apparatuses via a communication path N such as the Internet. Of course, the terminal apparatus 10 and the server 12 may perform communication with other apparatuses via different communication paths without using the communication path N, and may be perform direct communication with other apparatuses. Plural terminal apparatuses 10 or plural servers 12 may be included in the information processing system.

The terminal apparatus 10 is an apparatus such as a personal computer (PC), a tablet PC, a smart phone, or a mobile phone, and has a function of transmitting and receiving data to and from other apparatuses. The terminal apparatus 10 may be a wearable terminal (for example, a wristwatch type terminal, a wristband type terminal, a spectacle type terminal, a ring type terminal, a contact lens type terminal, an intracorporeal embedded type terminal, and a hearable terminal). The terminal apparatus 10 may have a flexible display as a display device. As the flexible display, for example, an organic electroluminescence type display (flexible organic EL display), an electronic paper type display, or a flexible liquid crystal display is used. Flexible displays employing display methods other than those described may be used. The flexible display is a display of which a display portion is flexibly deformable, and is, for example, a display which can be bent, folded, rolled, twisted, or stretched. The entire terminal apparatus 10 may be configured with the flexible display, and the flexible display and other configurations may be separate from each other functionally or physically.

The server 12 is an apparatus which manages data or user information. The server 12 has a function of transmitting and receiving data to and from other apparatuses. The server 12 may provide a social networking service (SNS) to a user. In this case, the terminal apparatus 10 can perform transmission and reception of information (for example, text, still images, moving images, and voices) with other terminal apparatuses 10 using the SNS by using the SNS provided by the server 12.

In the terminal apparatus 10, a conversation partner having a function of having a conversation with the user is used. The conversation partner functions as a response assistant which responds to an inquiry from the user, and, for example, receives a speech of the user, analyzes the speech contents, creates a response such as a reply, and notifies the user thereof. For example, the user's speech is given through text input, voice input, or image input, and a response is made through text output, voice output, or image output. The conversation partner is realized, for example, by executing a program, and the program is installed in, for example, the terminal apparatus 10. Of course, the program regarding the conversation partner may be installed in an external apparatus such as the server 12, and a function of the conversation partner or a service providing the function may be provided to the terminal apparatus 10 from the external apparatus such as the server 12.

The conversation partner is configured with automatic response artificial intelligence (AI) realized by, for example, AI. The automatic response AI has a function of analyzing speech contents of the user, and notifying the user of a response such as a reply to the speech contents. The automatic response AI may be a so-called chatbot (an automatic dialogue program using artificial intelligence). The automatic response AI may have a learning function using artificial intelligence, and may have the capability of performing determination close to a person through the learning function. Neural network type deep learning may be used, enhancement learning in which a learning field is partially enhanced may be used, and a genetic algorithm, cluster analysis, self-organizing map, ensemble learning, and the like may be used. Of course, techniques regarding artificial intelligence other than these may be used. The automatic response AI may search for a reply to an inquiry from the user by using a network such as the Internet, may create a response on the basis of a search result, and may notify the user of the response.

In the present exemplary embodiment, content is compared with registered content, and execution of processes corresponding to a comparison result and the content is controlled. The content is, for example, a file (data) such as a document file (data having a document form), an image file (data having an image form), or a table file (data having a table form). The image file may be a still image, and may be a moving image. The content is, for example, a contract file or an account book file. Of course, other files may be used as the content according to the present exemplary embodiment. The registered content is content which is registered earlier than content compared therewith. For example, the registered content is stored in the server 12 so as to be registered in the server 12. Of course, the registered content may be stored in the terminal apparatus 10 so as to be registered in the terminal apparatus 10. The registered content is content created by a predefined template. The content compared with the registered content is content created on the basis of the registered content. For example, in a case where the content is sent to the automatic response AI, the content is compared with the registered content, execution of processes corresponding to a comparison result and the content is controlled. The comparison process may be performed by the server 12, and may be performed by the terminal apparatus 10. Execution of the processes may be controlled by the server 12, and may be controlled by the terminal apparatus 10. The processes are, for example, a process of extracting a difference between the registered content and the content, a process of presenting an amendment to the content, and a process of giving advice to the user.

Figure 2:
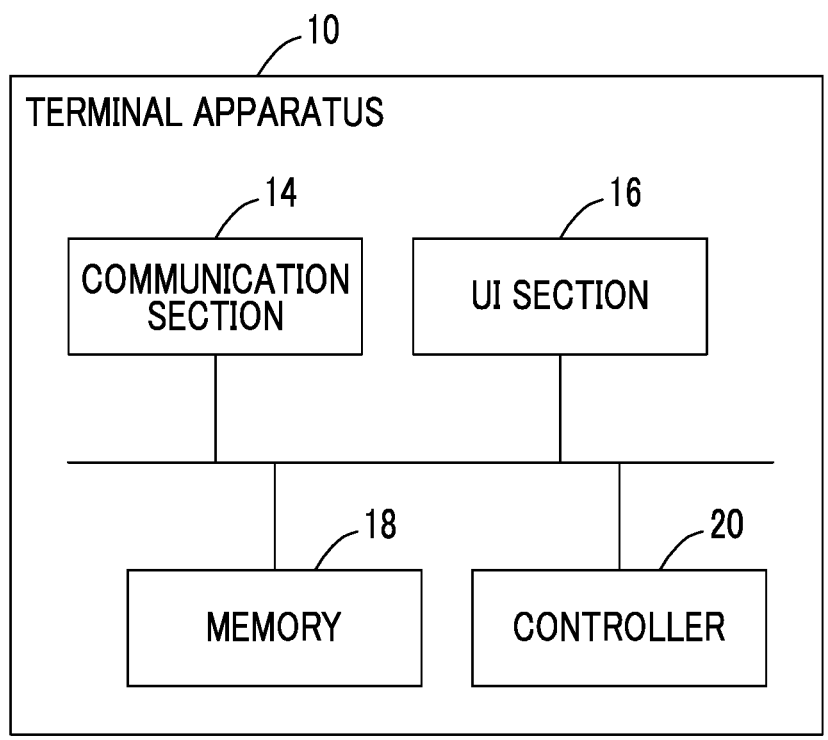
FIG. 2 is a block diagram illustrating a configuration of a terminal apparatus.

Hereinafter, with reference to FIG. 2, a configuration of the terminal apparatus 10 will be described in detail. FIG. 2 illustrates an example of the terminal apparatus 10.

A communication section 14 is a communication interface, and has a function of transmitting data to other apparatuses, and a function of receiving data from other apparatuses. The communication section 14 may be a communication interface having a wireless communication function, and may be a communication interface having a wired communication function. The communication section 14 may conform to, for example, a single or plural types of communication methods, and may perform communication with a communication partner according to a communication method suitable for the communication partner (that is, a communication method to which the communication partner conforms). The communication method is, for example, infrared communication, visible light communication, Wi-Fi (registered trademark) communication, or short-range radio communication (for example, Near Field Communication (NFC)). As the short-range radio communication, for example, Felica (registered trademark), Bluetooth (registered trademark), or the Radio Frequency Identifier (RFID) is used. Of course, other types of wireless communication may be used as the short-range radio communication. The communication section 14 may change a communication method or a frequency bandwidth according to a communication partner, and may change a communication method or a frequency bandwidth according to a surrounding environment.

A UI section 16 is a user interface, and includes a display and an operation unit. The display is a display device such as a liquid crystal display. The display may be a flexible display. The operation unit is an input device such as a touch panel or a keyboard. A user interface (including, for example, a touch display or a device in which a keyboard or the like is electronically displayed on a display) which functions as both of a display and an operation unit may be used. The UI section 16 may include a sound collecting unit such as a microphone or a sound generation unit such as a speaker. In this case, information may be input to the terminal apparatus 10 through voice input, and information may be output with a voice.

A memory unit 18 is a storage device such as a hard disk drive or a memory (for example, an SSD). The memory unit 18 stores, for example, various pieces of data, various programs (for example, an operating system (OS) and various application programs (application software)), information indicating addresses of other apparatuses, and information (server address information) indicating an address of the server 12. These may be stored in other storage devices, and may be stored in a single storage device. The registered content, the content compared therewith, template data, or the like may be stored in the memory unit 18.

The memory unit 18 stores an automatic response AI program (software) for realizing the automatic response AI, and a function of the automatic response AI is realized by executing the automatic response AI program. The automatic response AI program may be stored in an external apparatus such as the server 12, and may be executed by the external apparatus such that a function of the automatic response AI is provided to the terminal apparatus 10 from the external apparatus. In this case, the automatic response AI program may not be stored in the memory unit 18.

The memory unit 18 may store an SNS application program for using an SNS provided by the server 12. The SNS application program is executed, and thus the SNS can be used.

A control unit 20 has a function of controlling an operation of each unit of the terminal apparatus 10. For example, the control unit 20 performs execution of various programs, control of communication using the communication section 14, control of a notification (for example, information display or voice output) of information using the UI section 16, reception of information which is input by using the UI section 16, reading of information from the memory unit 18, and writing of information to the memory unit 18. For example, the control unit 20 executes the automatic response AI program, and thus the function of the automatic response AI is realized.

Figure 3:
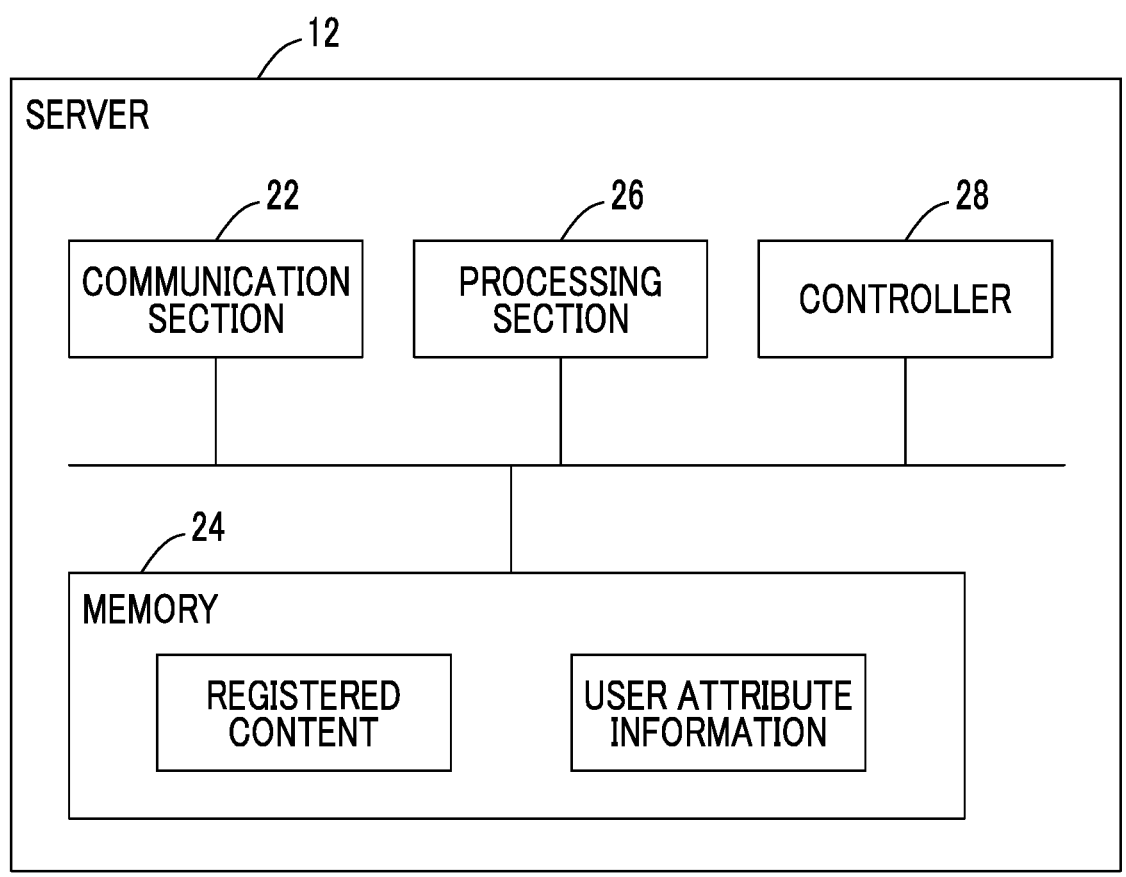
FIG. 3 is a block diagram illustrating a configuration of a server.

Hereinafter, with reference to FIG. 3, a configuration of the server 12 will be described in detail. FIG. 3 illustrates an example of the server 12.

A communication section 22 is a communication interface, and has a function of transmitting data to other apparatuses, and a function of receiving data from other apparatuses. The communication section 22 may be a communication interface having a wireless communication function, and may be a communication interface having a wired communication function. The communication section 22 may conform to, for example, a single or plural types of communication methods, and may perform communication with a communication partner according to a communication method suitable for the communication partner. The communication method is, for example, infrared communication, visible light communication, Wi-Fi communication, or short-range radio communication. Other types of wireless communication may be used as the short-range radio communication. The communication section 22 may change a communication method or a frequency bandwidth according to a communication partner, and may change a communication method or a frequency bandwidth according to a surrounding environment.

A memory unit 24 is a storage device such as a hard disk drive or a memory. The memory unit 24 stores, for example, various pieces of data, various programs (for example, an operating system (OS) and various application programs (application software)), information indicating addresses of other apparatuses, and information (terminal address information) indicating an address of the terminal apparatus 10. These may be stored in other storage devices, and may be stored in a single storage device.

The memory unit 24 stores the registered content. The registered content is correlated with attribute information (content attribute information) of the registered content. The content attribute information correlated with the registered content includes, for example, information (content identification information) for identifying the registered content, information indicating the type of registered content, and information (user identification information) for identifying a user who instructs the registered content to be registered. The content identification information correlated with the registered content is, for example, the name (for example, the name of a file) or an ID (for example, an ID of a file) of the content. The type of content may include, for example, a contract or an account book. The content attribute information correlated with the registered content may include information (template identification information) for identifying a template used to create the registered content or information (registration date and time information) indicating the date and time on which the registered content is registered. The template identification information is, for example, the name or an ID of a template.

The memory unit 24 stores user attribute information. The user attribute information is information indicating an attribute of the user, and includes information (user identification information) for identifying the user, information (schedule information) indicating a schedule of the user, information (company identification information) for identifying a company to which the user belongs, information (division identification information) for identifying a division or a department to which the user belongs. The user identification information is, for example, the name or an ID of the user. The schedule information is, for example, information indicating plans of the user (for example, a plan for a day, a plan for a week, a plan for a month, or a plan for a year). The user attribute information may include information (qualification information) indicating the qualification owned by the user. The user attribute information may include information regarding a company to which the user belongs. The information regarding the company includes, for example, information regarding a business type related to the company, information regarding a scale of the company, information regarding an asset of the company, and information regarding a product manufactured by the company. The information regarding the scale is, for example, information indicating the number of employees or capital. The information regarding the asset is, for example, information indicating a tangible asset, an intangible asset, and other assets. The tangible asset is an asset which physically exists, such as a land, a building, or equipment. The intangible asset is an asset which does not physically exist, such as an intellectual property right. Other assets are assets such as claims, deposits, or securities. The user attribute information is referred to, and, thus, for example, a schedule (plan) of the user, or a company or a division to which the user belongs is specified. The information included in the user attribute information can be said to be background circumstances of the user.

A processing section 26 has a function of comparing the content with the registered content, and performing processes corresponding to a comparison result and the content. The content is sent from, for example, the terminal apparatus 10. The content is created on the basis of the registered content. The content is correlated with attribute information (content attribute information) of the content. The content attribute information correlated with the content includes, for example, information (content identification information) for identifying the content, information indicating the type of content, and information (user identification information) for identifying a user who instructs the content to be transmitted. The content identification information correlated with the content may include information (content identification information correlated with the registered content) for identifying the registered content used to create the content, information (template identification information) for identifying a template which is a basis of the content, or information (transmission date and time information) indicating the date and time on which the content is transmitted.

The processing section 26 refers to, for example, the content attribute information correlated with the content sent from the terminal apparatus 10 and the content attribute information correlated with the registered content stored in the memory unit 24, so as to specify the registered content which is a comparison target of the content. The processing section 26 compares the content with the registered content which is a comparison target, and performs processes corresponding to a comparison result and the content. The processing section 26 specifies the registered content which is a comparison target on the basis of, for example, the content identification information, the information indicating the type of content, or the user identification information included in the content attribute information. Specifically, the processing section 26 specifies registered content of which content identification information matches that of content sent from the terminal apparatus 10 or has a correspondence relationship therewith, as registered content which is a comparison target of the content. As another example, the processing section 26 may specify registered content of which content identification information and information indicating the type of content match those of content sent from the terminal apparatus 10 as registered content which is a comparison target of the content. As still another example, the processing section 26 may specify registered content of which user identification information and information indicating the type of content match those of content sent from the terminal apparatus 10 as registered content which is a comparison target of the content. As still another example, in a case where content identification information of registered content is included in content attribute information correlated with content sent from the terminal apparatus 10, the processing section 26 may specify registered content having the content identification information as registered content which is a comparison target of the content.

Regarding the processes corresponding to the comparison result and the content, the processing section 26 performs a process of presenting an amendment to the content, a process of giving advice to the user, and a process of extracting a difference between the registered content and the content. The processing section 26 changes a process according to the type of content. The processing section 26 may change a process according to an attribute of the user.

A controller unit 28 has a function of controlling an operation of each unit of the server 12. For example, the controller unit 28 performs execution of various programs, control of communication using the communication section 22, reading of information from the memory unit 24, writing of information to the memory unit 24, and control of execution of a process performed by the processing section 26. The controller unit 28 changes a process to be performed by the processing section 26 according to, for example, the type of content or an attribute of the user, and causes the processing section 26 to perform the process. The automatic response AI program may be stored in the memory unit 24. In this case, the controller unit 28 may execute the automatic response AI program so as to provide a function of the automatic response AI to the terminal apparatus 10.

The processing section 26 may be included in the terminal apparatus 10, and the processing section 26 may perform a process in the terminal apparatus 10. In this case, the processing section 26 may not be included in the server 12. The registered content or the user attribute information may be stored in the memory unit 18 of the terminal apparatus 10. In this case, the registered content or the user attribute information may not be stored in the memory unit 24 of the server 12. The processing section 26 included in the terminal apparatus 10 refers to, for example, the registered content or the user attribute information stored in the terminal apparatus 10 or the server 12, and performs processes corresponding to a comparison result and the content. Of course, the registered content or the user attribute information may be stored in other devices.

Hereinafter, the information processing system according to the present exemplary embodiment will be described in more detail.

With reference to FIG. 4, a description will be made of content registration details and process contents performed by the processing section 26. FIG. 4 illustrates an example of a registration table. The registration table is a table indicating content registration details and process contents. In the registration table, for example, for example, information indicating the name of a registered file as registered content, information indicating a content of the registered file, and information indicating a content of a process performed by the processing section 26 by using the registered file are correlated with each other. Data of the registration table is stored in the memory unit 24 of the server 12, and, in a case where a new file is registered in the server 12 as a registered file, the name and a content of the file are added to the registration table, and a content of a process performed by using the file are further added to the registration table. The content of the process is predefined, for example, according to the type of file. The content of the file may be determined on the basis of an attribute of a user who gives an instruction for registration of the registered file or an attribute of a user who gives an instruction for transmission of a file which is a comparison target of the registered file.

In the example illustrated in FIG. 4, a file of a material transaction contract, a file of an account book, a file of the account book and a receipt, and a file of a software license contract are registered in the registration table as registered content. The file (data) is, for example, a document file, a table file, or an image file.

For example, as contents of the file of the material transaction contract, the names of contracting parties, the purpose of the contract, contents of the contract, and the like are registered. For other files, contents of the files are registered.

As processes applied to the material transaction contract, for example, "(1) a process of extracting a difference between the file of the registered material transaction contract and a file of a material transaction contract compared therewith, and sending a notification of a changed portion" and "(2) a process of sending a notification of an advantage or a disadvantage due to the change" are registered in the registration table. These processes are set in advance as processes applied to the material transaction contract.

As a process applied to the account book, for example, "(1) a process of updating a content of the file of the registered account book by overwriting the file of the registered account book with a file of a new account book" is registered in the registration table. This process is set in advance as a process applied to the account book.

As processes applied to the account book and the receipt, for example, "(1) a process of adding a content of a file of a new receipt to the file of the registered account book, and sending a notification of a result of integrating amounts of money" and "(2) a process of adding a content of a file of a new receipt to the file of the registered account book, and updating a database of the account book" are registered in the registration table. These processes are set in advance as processes applied to the account book and the receipt.

As a process applied to the software license contract, for example, "(1) a process of sending a notification of restrictions on the user or a fee to be charged in a case of using software" is registered in the registration table. This process is set in advance as a process applied to the software license contract.

Hereinafter, with reference to FIG. 5, a template will be described in detail. FIG. 5 illustrates an example of a template. A template 30 is a template of a material transaction contract as an example, and is a template in which predefined contract contents (for example, a fixed form sentence) are written according to a predefined format. The template 30 may be data such as a document file, a table file, or an image file, and may be a physical paper sheet. For example, a date field, a parties field 32, and contract clauses 34 are written in the template 30. The date field is a field in which, for example, the contract concluding date is written, and is blank in the template 30. The parties field 32 is a field in which information (for example, a name or a company name) for identifying contracting parties is written, and is blank in the template 30. In the example illustrated in FIG. 5, the parties field 32 is blank in order to write names or company names of contracting parties X and Y therein. Predefined contract contents (for example, general contract contents in a material transaction) are written in advance in the contract clauses 34. The contract clauses 34 include blank fields. The blank fields are fields in which contract contents individually concluded between the contracting parties X and Y are written. In the example illustrated in FIG. 5, an inspection period is defined in Paragraph 3 of the contract clauses 34, and a portion in which a specific number of days in the inspection period is written is blank. The template 30 is only an example of a template according to the present exemplary embodiment, and templates other than the template 30 may be used.

Figure 6:
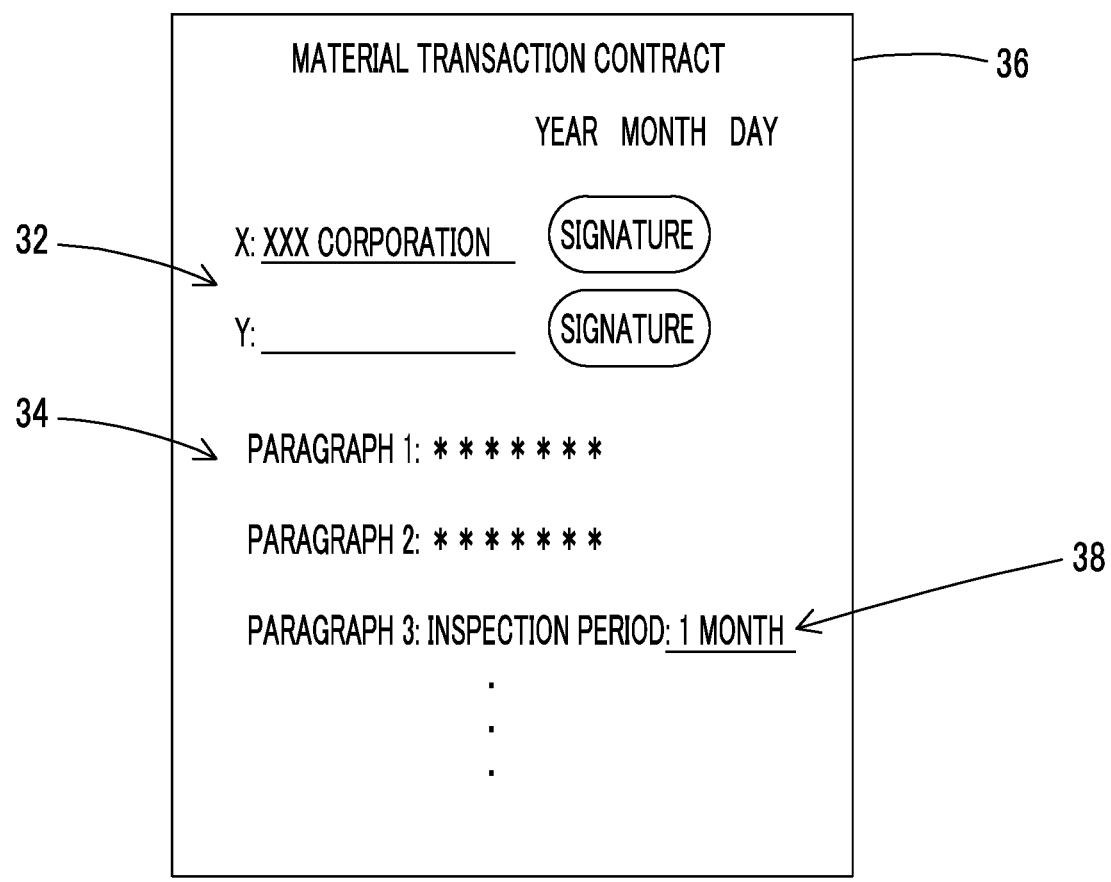
FIG. 6 is a diagram illustrating a material transaction contract.

For example, a user X who is a person in charge of the contracting party X creates a material transaction contract by using the template 30. FIG. 6 illustrates a material transaction contract 36 created by the user X. A company name (for example, "XXX Corporation") of a company to which the user X belongs is written in the parties field 32, and a specific number of days (for example, "a month") is written in the blank field of the inspection period in the contract clauses 34 as indicated by the reference numeral 38. The user X may add each piece of information to data such as a document file, a table file, or an image file representing the template 30, and may write each piece of information to the template 30 configured with a physical paper sheet.

In a case where the material transaction contract 36 is configured with a file (data), the file of the material transaction contract 36 is transmitted to the server 12. In a case where the file of the material transaction contract 36 is created by the terminal apparatus 10, the file is transmitted to the server 12 from the terminal apparatus 10. In a case where the file of the material transaction contract 36 is created by an apparatus (for example, a PC) other than the terminal apparatus 10, the file may be transmitted to the server 12 from the apparatus. The controller unit 28 of the server 12 stores the transmitted file of the material transaction contract 36 in the memory unit 24 as registered content. Consequently, the file of the material transaction contract 36 is registered in the server 12 as the registered content. For example, the name and a content of the file of the material transaction contract 36 are registered in the registration table illustrated in FIG. 4, and predefined processes applied to a file of the type of material transaction contract are registered in the registration table in correlation with the file of the material transaction contract 36. Such a registration process is performed by the controller unit 28 of the server 12.

In a case where the material transaction contract 36 is configured with a physical paper sheet, the user X reads the material transaction contract 36 with a scanner or images the material transaction contract 36 with a camera. Consequently, an image file representing the material transaction contract 36 is generated. A character recognition process such as optical character recognition (OCR) may be applied to the image file by a scanner, a camera, or the terminal apparatus 10, and thus a document file or a table file representing the material transaction contract 36 may be generated. In the same manner as described, the file of the material transaction contract 36 is transmitted to the server 12 from the terminal apparatus 10 or another apparatus, and is stored in the memory unit 24 of the server 12 as registered content.

For example, in a case where a registration screen is displayed on the terminal apparatus 10 or another apparatus which is a data transmission source, and the user X gives an instruction for registration of the material transaction contract 36 on the registration screen, the file of the material transaction contract 36 is transmitted to and registered in the server 12.

The file of the material transaction contract 36 is correlated with content attribute information. The correlation may be performed by the terminal apparatus 10 or another apparatus used to create the file of the material transaction contract 36, and may be performed by the server 12. For example, in a case where the user X inputs content identification information such as the name of the material transaction contract 36, information indicating the type (for example, a material transaction contract) of the material transaction contract 36, and user identification information such as the name or an ID of the user X by using the terminal apparatus 10, the control unit 20 of the terminal apparatus 10 correlates such information with the file of the material transaction contract 36 as content attribute information. In a case where information (for example, information indicating a material transaction contract) indicating the type is correlated with the data of the template 30, the information may be included in the content attribute information. In a case where information (template identification information) for identifying the template 30 is correlated with the data of the template 30, the template identification information may be included in the content attribute information. Information indicating the registration date and time of the file of the material transaction contract 36 may be included in the content attribute information. User attribute information other than the user identification information may be included in the content attribute information.

As mentioned above, the material transaction contract 36 is created by the user X, and then the material transaction contract 36 is sent from "XXX Corporation" which is one contracting party X to the other contracting party Y (for example, "YYY Co., Ltd."). The file of the material transaction contract 36 may be sent from the contracting party X to the contracting party Y, and a paper sheet of the material transaction contract 36 may be sent from the contracting party X to the contracting party Y.

Figure 7:
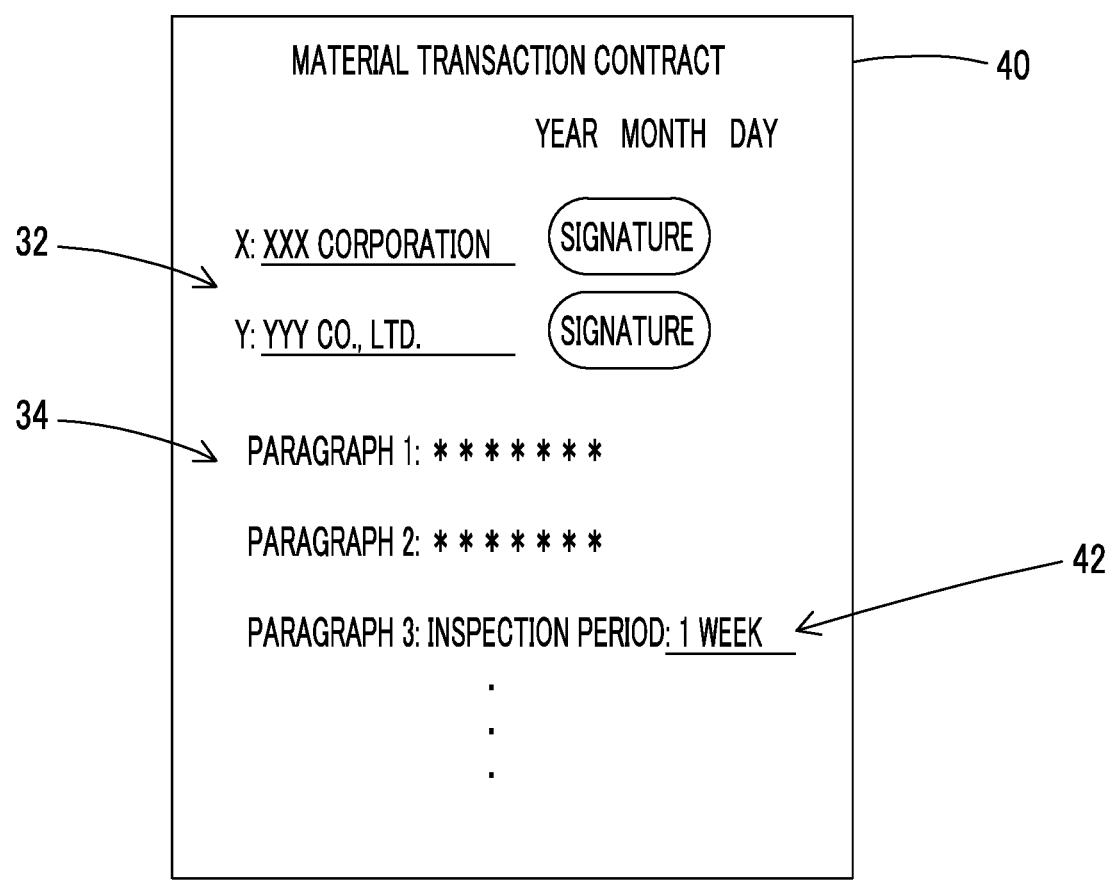
FIG. 7 is a diagram illustrating a material transaction contract.

A user Y who is a person in charge of the other contracting party Y may check the content of the material transaction contract 36 sent from XXX Corporation, and may change the content of the material transaction contract 36 or add a content to the material transaction contract 36. FIG. 7 illustrates a material transaction contract 40 after changing or adding is performed on the material transaction contract 36. The material transaction contract 40 is a contract of or to which a content is changed or added by the user Y on the basis of the material transaction contract 36 created by the user X.

The user Y may perform changing or adding on the file of the material transaction contract 36 created by the user X, and may perform changing or adding on the material transaction contract 36 configured with a physical paper sheet. Changing or adding is performed on the file of the material transaction contract 36 such that the content of the file is updated, and a file of the material transaction contract 40 in which the update is reflected is generated. FIG. 7 illustrates the material transaction contract 40 as a file. A company name (for example, "YYY Co., Ltd.") of the company to which the user Y belongs is written in the parties field 32. As indicated by the reference numeral 42, the inspection period in the contract clauses 34 is changed from "a month" to "a week" by the user Y. In a case where changing is performed on the material transaction contract 36 configured with a physical paper sheet, for example, double lines are drawn on a changed portion, and a new content is written on an adjacent portion or the like. For example, double lines are drawn on the text "1 month", and the text "1 week" is written on an adjacent portion or the like.

In a case where the file of the material transaction contract 40 is created on the basis of the file of the material transaction contract 36, content attribute information correlated with the file of the material transaction contract 40 includes the content attribute information correlated with the file of the material transaction contract 36. For example, the content attribute information correlated with the file of the material transaction contract 40 may be the same information as the content attribute information correlated with the file of the material transaction contract 36, and new content identification information for identifying the material transaction contract 40 may be created to be correlated with the file of the material transaction contract 40.

As mentioned above, the material transaction contract 40 is created by the user Y on the basis of the material transaction contract 36, and then the material transaction contract 40 is sent from "YYY Co., Ltd." which is the contracting party Y to "XXX Corporation" which is the contracting party X. The file of the material transaction contract 40 may be sent from the contracting party Y to the contracting party X, and a paper sheet of the material transaction contract 40 may be sent from the contracting party Y to the contracting party X.

In a case where the file of the material transaction contract 40 is sent from the contracting party Y to the contracting party X, the user X who is a person in charge of the contracting party X uses the file as a processing target of the processing section 26.

In a case where the paper sheet of the material transaction contract 40 is sent from the contracting party Y to the contracting party X, the user X reads the paper sheet with the scanner or images the paper sheet with the camera. Consequently, an image file representing the material transaction contract 40 is generated. A character recognition process may be applied to the image file, and thus a document file or a table file representing the material transaction contract 40 may be generated. The user X uses the file as a processing target of the processing section 26. The file of the material transaction contract 40 generated through reading or imaging includes the content attribute information correlated with the file of the material transaction contract 36. For example, the content attribute information correlated with the material transaction contract 40 may be the same information as the content attribute information correlated with the material transaction contract 36, and new content identification information for identifying the material transaction contract 40 may be created to be correlated with the file of the material transaction contract 40. For example, in a case where the user X gives an instruction for the correlation by using the UI section 16 of the terminal apparatus 10, the control unit 20 of the terminal apparatus 10 correlates the content attribute information with the file of the material transaction contract 40.

The file of the material transaction contract 40 is a file compared with the registered material transaction contract 36. In the present exemplary embodiment, the file of the material transaction contract 40 is sent to the server 12 through a conversation with the automatic response AI, and a process is performed by the processing section 26.

Hereinafter, a file comparison process will be described in detail.

Figure 8:
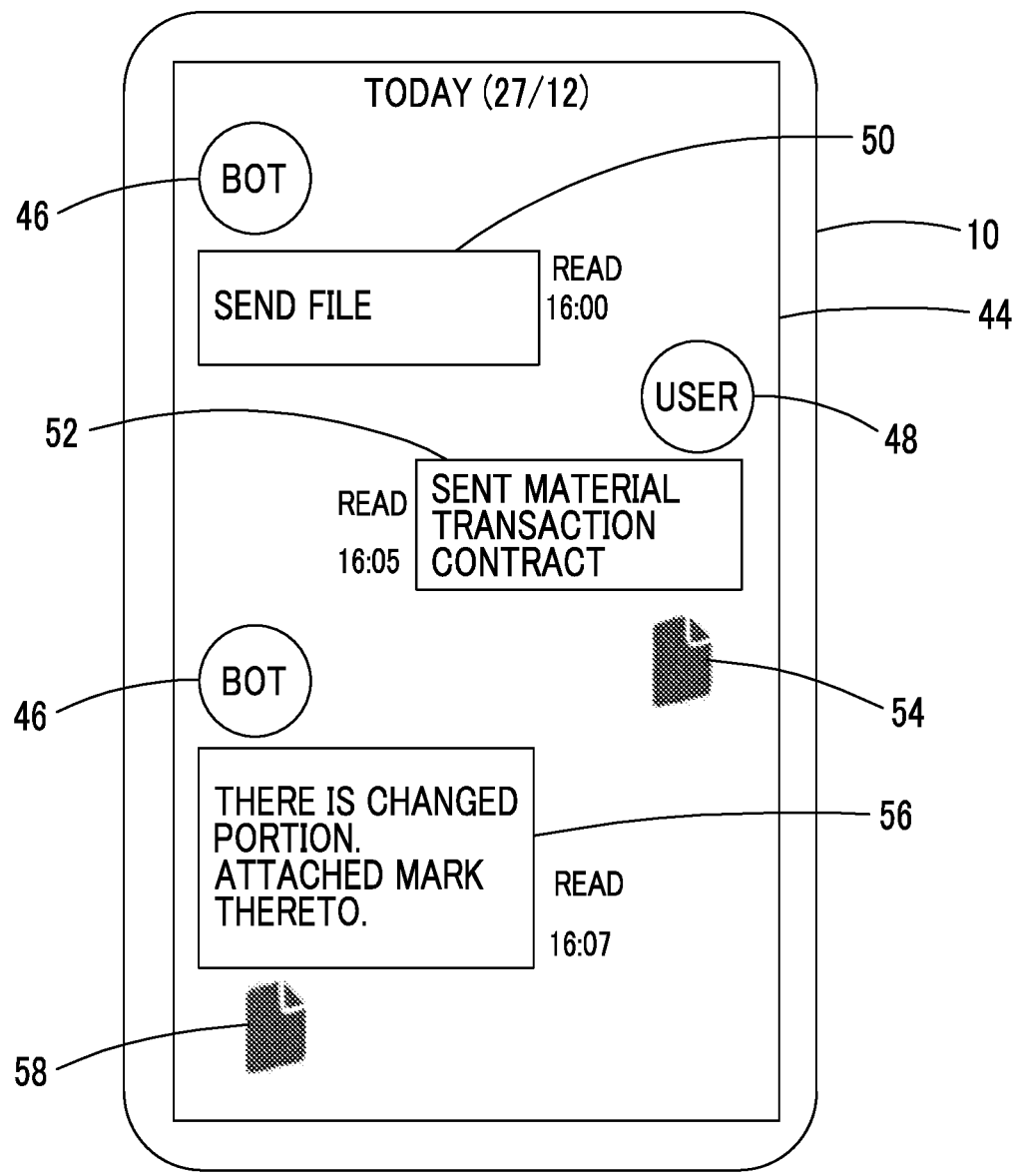
FIG. 8 is a diagram illustrating a screen.

FIG. 8 illustrates an example of a screen displayed during use of the automatic response AI. The control unit 20 of the terminal apparatus 10 displays a screen 44 on the display of the UI section 16, and displays various pieces of information on the screen 44. The screen 44 is an interface (conversation response screen) for a user (in the above example, the "user X") to have a conversation with the automatic response AI. In other words, the screen 44 is a user interface in an interactive form. Information (for example, text or an image) which is input to the terminal apparatus 10 by the user X and information (for example, text or an image) indicating a speech content of the automatic response AI are displayed on the screen 44. A conversation between the user X and the automatic response AI may be a conversation in a so-called chat form (that is, a conversation in a real time form, further, that is, a form in which conversations progress while the user X and the automatic response AI make speeches with each other). For example, in a case where the user X gives an execution instruction to the automatic response AI program (for example, a chat program), the control unit 20 executes the automatic response AI program, and displays the screen 44 for making a conversation with the automatic response AI on the display. The automatic response AI program may be executed by an external apparatus such as the server 12. In this case, the information of the screen 44 is transmitted to the terminal apparatus 10 from the external apparatus, and the screen 44 is displayed on the display of the terminal apparatus 10.

The control unit 20 displays an image 46 associated with the automatic response AI and an image 48 associated with a user on the screen 44. The image 46 is an image for identifying the automatic response AI. The image 48 is an image for identifying a user (for example, the "user X"). Instead of the image 46 or along with the image 46, text (for example, text such as the text "bot") indicating the automatic response AI may be displayed. Similarly, instead of the image 48 or along with the image 48, text (for example, text for identifying the user, such as a name, a user ID, a handle name, or a nickname) indicating the user may be displayed.

The image 46 associated with the automatic response AI is displayed in a region allocated to the automatic response AI in the screen 44. The image 48 associated with the user is displayed in a region allocated to the user using the terminal apparatus 10 in the screen 44.

In the example illustrated in FIG. 8, a region for the automatic response AI is set on the left part in the screen 44, and the image 46 associated with the automatic response AI is displayed in the left region. A speech content of the automatic response AI is associated with the image 46, and is displayed to be biased toward the left region. A region for the user is set on the right part in the screen 44, and the image 48 associated with the user is displayed in the right region. A speech content of the user is associated with the image 48, and is displayed to be biased toward the right region. Of course, this display example is only an example, a disposition relationship of the regions may be reversed, the respective regions may be set in a vertical direction, the regions may entirely or partially overlap each other, and the latest speech content may be displayed in a specific region (for example, the central region) of the screen 44, and the past speech content may be displayed on the periphery thereof. The respective regions may have the same size as each other, may have sizes which are different from each other, and may be enlarged or reduced according to an amount of speech contents or the number of speeches. Setting of the regions or control of sizes thereof is performed by the control unit 20.

In the example illustrated in FIG. 8, speakers are only a single user (for example, the "user X") and single automatic response AI, but plural users or plural pieces of automatic response AI may participate in conversations. In this case, a region for each speaker may be provided in the screen 44. For example, in a case where two users and single automatic response AI participate in conversations, three regions are set in the screen 44, and a speech content of each speaker is displayed in the region thereof. For example, in a case where communication is performed among plural terminal apparatuses 10, and thus plural users have conversations with each other via the screen 44, speech contents of the plural users are displayed on the screen 44. This is also the same for a case where plural pieces of automatic response AI participate in conversations. A program regarding plural pieces of automatic response AI may be installed in the identical terminal apparatus 10, and the plural pieces of automatic response AI may be stored in the identical terminal apparatus 10, and programs regarding respective pieces of automatic response AI may be installed in other terminal apparatuses 10, and the respective pieces of automatic response AI may be stored in the other terminal apparatuses 10. For example, on the screen 44, a speech content of the automatic response AI stored in the terminal apparatus 10 which is its own apparatus is displayed, and a speech content of the automatic response AI stored in another terminal apparatus 10 is displayed. The automatic response AI stored in another terminal apparatus 10 participates in conversations via, for example, the communication path N.

Thereafter, the user and the automatic response AI have conversations with each other. In the conversations, the user may input text, an image, or the like by operating the UI section 16, so as to input a speech content, and may input a speech content in voices. The speech content of the user may be displayed on the screen 44 as information such as text or an image, and may not be displayed. Similarly, a speech content of the automatic response AI may be displayed on the screen 44 as information such as text or an image, and may not be displayed or may be displayed and also emitted as voices. Hereinafter, as an example, a description will be made of a case where a speech content of each speaker is displayed on the screen 44, but each speech content may be emitted in voices.

The respective speech contents are displayed in a time series according to the transmission date and time. For example, the date and time on which the user X sends a speech content thereof to the automatic response AI corresponds to the transmission date and time of a speech content of the user X. The date and time on which the automatic response AI creates a response or the date and time on which a speech content as the response is displayed on the screen 44 corresponds to the transmission date and time of a speech content of the automatic response AI.

In a case where a conversation progresses on the screen 44, the control unit 20 scrolls the screen 44, so as to display the latest speech content or the previous speech content on the screen 44. Consequently, the past speech contents which may not be displayed on the screen 44 are not displayed on the screen 44.

For example, in a case where the user X makes a speech with the content that "I want to perform a file comparison process", the automatic response AI analyzes the speech content of the user X, and thus identifies that the user X requests execution of a comparison process. The speech content of the user X is displayed on the screen 44. In a case where the automatic response AI identifies that the user X requests execution of a comparison process, the automatic response AI makes a speech with the content that "please send a file". Text indicating the content is displayed on the screen 44 as a speech content 50 of the automatic response AI. Of course, instead of the text or along with the text, the speech content of the automatic response AI may be emitted as voices. Since the speech content 50 is a speech content of the automatic response AI, the control unit 20 displays the speech content 50 on the screen 44 in association with the image 46 of the automatic response AI. This is also the same for the following conversations.

Next, in a case where the user X sends content to be compared with registered content to the automatic response AI, the content is compared with the registered content, and processes corresponding to a comparison result and the content are performed.

For example, in a case where the registered material transaction contract 36 (refer to FIG. 6) is compared with the material transaction contract 40 (refer to FIG. 7) sent from the contracting party Y, the user X sends the material transaction contract 40 to the automatic response AI. In this case, the material transaction contract 40 corresponds to the content to be compared with the registered content. For example, in a case where the user X makes a speech with the content that "I sends the material transaction contract", text indicating the content is displayed on the screen 44 as a speech content 52 of the user. In this case, the user X designates the file of the material transaction contract 40 as a comparison target file, and sends the file to the automatic response AI. For example, the file of the material transaction contract 40 is stored in the memory unit 18 of the terminal apparatus 10, and the control unit 20 displays an image 54 (for example, an icon) associated with the material transaction contract 40 on the screen 44. In a case where the user X designates the image 54 by using the UI section 16, and gives a transmission instruction (for example, the transmission instruction may be given through a flick operation), the material transaction contract 40 is sent to the automatic response AI.

In a case where a transmission instruction for the material transaction contract 40 is given, the terminal apparatus 10 transmits the file of the material transaction contract 40 to the server 12.

In the server 12, the processing section 26 retrieves registered content (registered file) related to the file of the material transaction contract 40 in the registration table stored in the memory unit 24. The processing section 26 retrieves a file related to the file of the material transaction contract 40 by using information included in content attribute information correlated with the file of the material transaction contract 40 as a search key. As the search key, for example, content identification information, information indicating the type of content, or user identification information is used. For example, in a case where content attribute information correlated with the file of the registered material transaction contract 36 is included in content attribute information correlated with the file of the material transaction contract 40, the processing section 26 specifies the file of the material transaction contract 36 as a file related to the file of the material transaction contract 40. The file of the material transaction contract 36 is used as a comparison target file for the file of the material transaction contract 40.

The processing section 26 may apply a language analysis process such as a natural language process on the file of the material transaction contract 40 sent from the terminal apparatus 10, so as to analyze a written content of the material transaction contract 40, and may further apply the language analysis process on each file registered in the registration table so as to analyze a written content of each file. The processing section 26 may specify a file having a written content (for example, an identical or similar written content) related to the written content of the material transaction contract 40 as a comparison target file for the material transaction contract 40. The processing section 26 may refer to information such as a title or a party included in a written content of each file so as to specify a comparison target file for the material transaction contract 40. The processing section 26 may refer to user identification information correlated with each file, and may search a file group correlated with identification information of the user X for a comparison target file for the material transaction contract 40. For example, a file which is correlated with identification information of the user X and of which the type is the same as the type of material transaction contract 40 may be specified as a comparison target file for the material transaction contract 40.

In the above-described way, in a case where the registered material transaction contract 36 which is a comparison target is specified, the processing section 26 compares the file of the registered material transaction contract 36 with the file of the material transaction contract 40, and performs processes corresponding to a comparison result and the material transaction contract 40. As illustrated in FIG. 4, process contents for the material transaction contract are "(1) a process of extracting a difference between the file of the registered material transaction contract and a file of a material transaction contract compared therewith, and sending a notification of a changed portion" and "(2) a process of sending a notification of an advantage or a disadvantage due to the change". The processing section 26 performs the process (1) or the process (2), for example, in response to the user's instruction. Of course, the processing section 26 may perform both of the process (1) and the process (2).

For example, as the process (1), the processing section 26 extracts a difference between the file of the registered material transaction contract 36 and the file of the material transaction contract 40, and sends a notification of a changed portion in a case where there is the changed portion. For example, the processing section 26 marks a portion changed from the material transaction contract 36 in the material transaction contract 40. Information regarding the comparison result and a file of the marked material transaction contract are transmitted from the server 12 to the terminal apparatus 10. The control unit 20 of the terminal apparatus 10 displays the information indicating the comparison result on the screen 44 as a speech content 56 of the automatic response AI. For example, the speech content 56 that "there is a changed portion; and the changed portion is marked" is displayed on the screen 44. The control unit 20 displays an image 58 associated with the file of the marked material transaction contract on the screen 44. In a case where the user X designates the image 58, and gives a display instruction for the file, the control unit 20 displays the material transaction contract with the marked changed portion on the display of the terminal apparatus 10.

With reference to FIGS. 6 to 9, the process will be described in detail. In the material transaction contract 40, the company name of the contracting party Y is added, and the inspection period is changed. In other words, such portions correspond to a difference between the material transaction contract 36 and the material transaction contract 40. In this case, the processing section 26 attaches marks to the difference portions.

Figure 9:
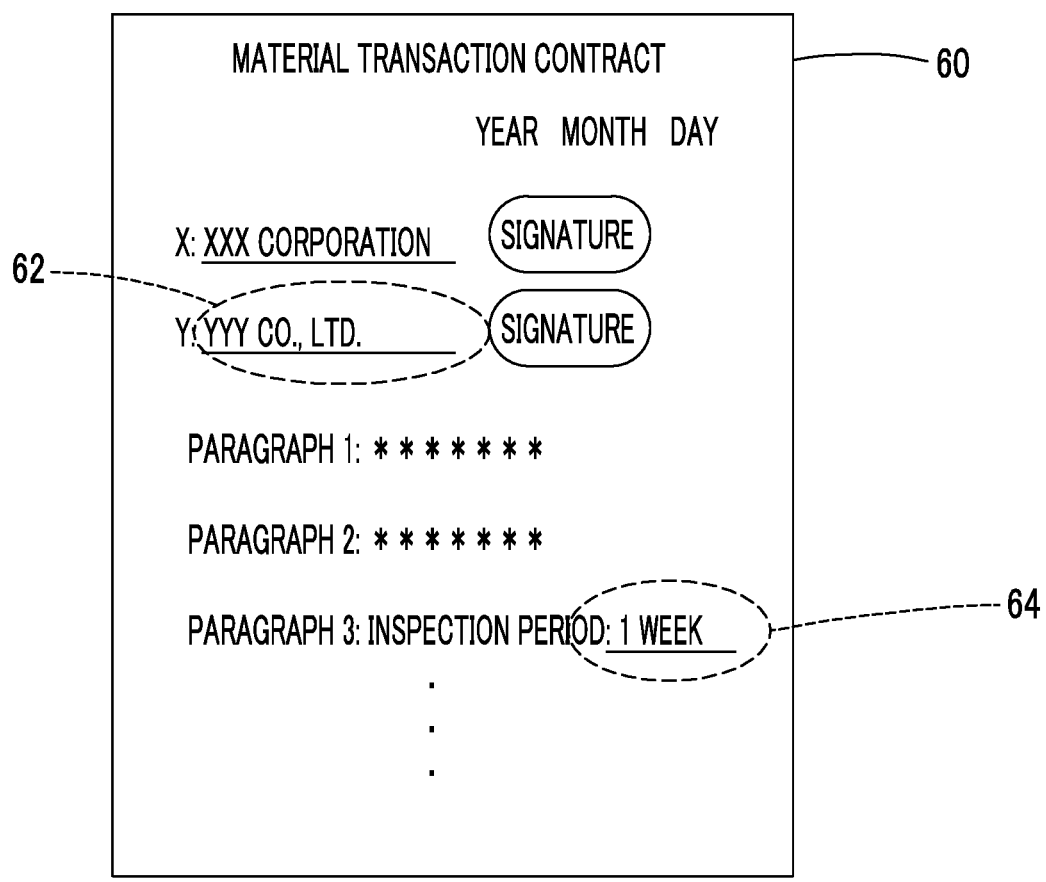
FIG. 9 is a diagram illustrating a material transaction contract.

FIG. 9 illustrates an example of a material transaction contract with a mark. A material transaction contract 60 is a contract in which marks are attached to changed portions in the material transaction contract 40. The company name of the contracting party Y is added, and thus a mark 62 is attached to the portion. The inspection period is changed, and thus a mark 64 is attached to the portion.

The processing section 26 generates a file of the material transaction contract 60. The file is transmitted from the server 12 to the terminal apparatus 10. The image 58 illustrated in FIG. 8 is an image associated with the material transaction contract 60. In a case where the user X designates the image 58, and gives a display instruction for the material transaction contract 60 (opens the file), the control unit 20 displays the material transaction contract 60 on the display of the UI section 16. In the above-described way, the user X can recognize a portion changed from the material transaction contract 36 created by the user X.

Figure 10:
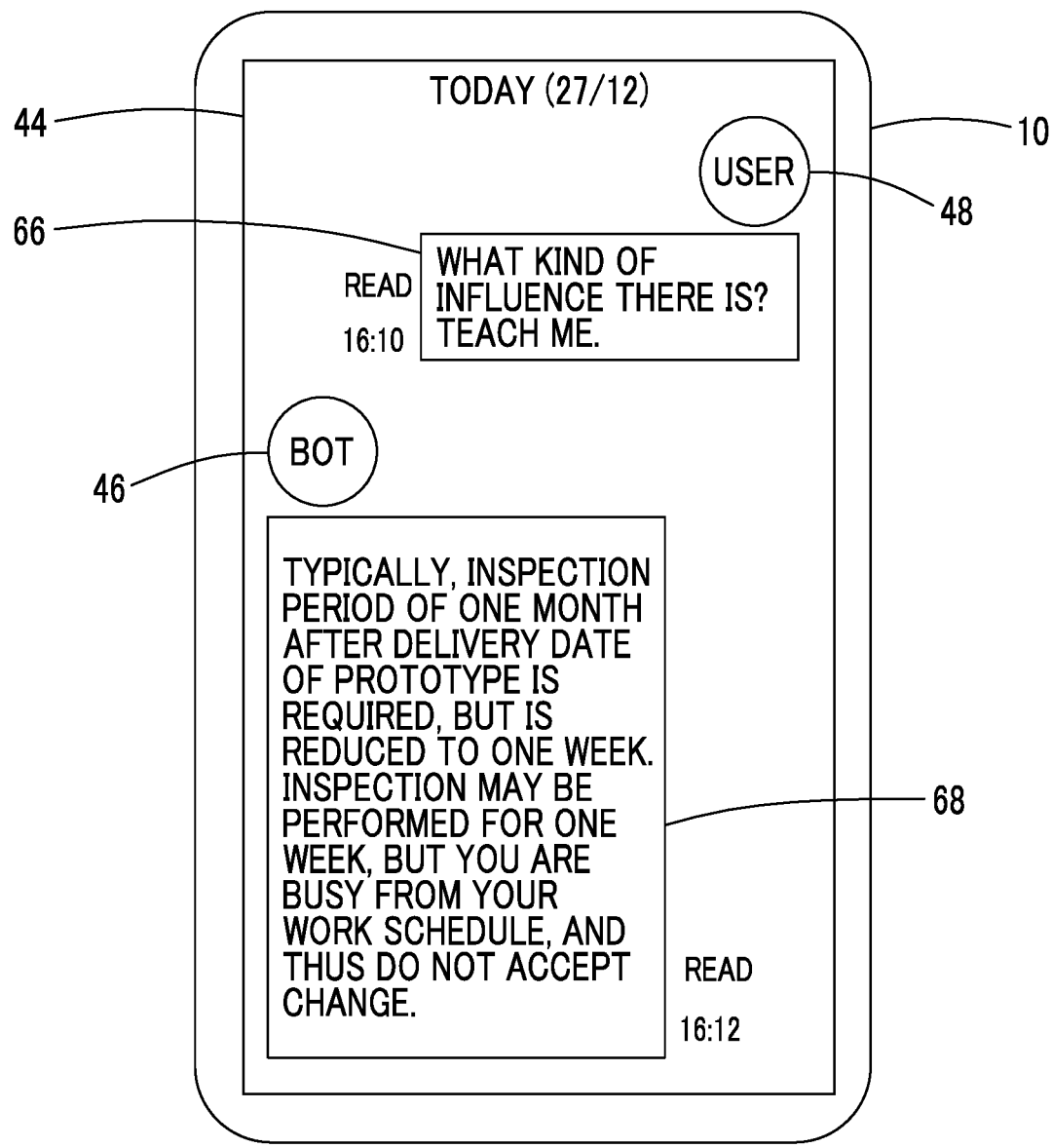
FIG. 10 is a diagram illustrating a screen.

FIG. 10 illustrates a situation subsequent to the conversations. For example, in a case where the user X makes a speech with the content that "what kind of influence (an advantage or a disadvantage) there is?; and teach me", text indicating the content is displayed on the screen 44 as a speech content 66 of the user.

The automatic response AI analyzes the speech content 66 so as to identify an inquiry from the user, and creates a response to the inquiry. In a case where the speech content 66 is emitted, the automatic response AI causes the processing section 26 of the server 12 to perform the process (2) in order to specify an advantage and a disadvantage due to the change. In this case, information indicating an execution command is transmitted from the terminal apparatus 10 to the server 12, and the processing section 26 performs the process (2) in response to the execution command. For example, the automatic response AI stored in the terminal apparatus 10 refers to the registration table stored in the server 12, and thus causes the processing section 26 to perform the process (2) as a process for the speech content 66. As another example, the automatic response AI installed in the terminal apparatus 10 may transmit information indicating the speech content 66 to another piece of AI installed in the server 12, and another AI may analyze the speech content 66, and may cause the processing section 26 to perform the process (2).

The processing section 26 having received the execution command for the process (2) specifies an advantage and a disadvantage due to the change from the written content of the material transaction contract 36 as the process (2). In the examples illustrated in FIGS. 6 and 7, the inspection period is reduced from "a month" to "a week", and thus the processing section 26 detects that the inspection period is reduced. The processing section 26 determines whether the reduction is advantageous or disadvantageous to the user X or the contracting party X. For example, the processing section 26 specifies a contracting party which will perform inspection by analyzing the material transaction contracts 36 and 40. In a case where the user X or the contracting party X performs inspection, a reduction of the inspection period is disadvantageous to the user X or the contracting party X. On the other hand, in a case where the user Y or the contracting party Y performs inspection, a reduction of the inspection period is advantageous to the user X or the contracting party X. Herein, it is assumed that the user X or the contracting party X performs inspection. In this case, the processing section 26 recognizes the reduction of the inspection period to be disadvantageous to the user X or the contracting party X.

The processing section 26 creates advice including an advantage or a disadvantage. Information indicating the advice is transmitted from the server 12 to the terminal apparatus 10, and is displayed on the screen 44 as a speech content of the automatic response AI.

The processing section 26 may create advice corresponding to an attribute of the user X. For example, the processing section 26 checks a schedule of the user X as an attribute of the user X, and creates advice by referring to the schedule. Information of the schedule is included in user attribute information of the user X, and is stored in the memory unit 24 of the server 12. The controller unit 28 of the server 12 may update the user attribute information stored in the memory unit 24 periodically, at a predefined timing, at a timing designated by a manager, or at a timing designated by each user. For example, the server 12 acquires information indicating a schedule of the user from another apparatus (for example, another server) managing the schedule of the user, and stores the information in the memory unit 24 as user attribute information of the user. Of course, the server 12 may be used as a management server managing a schedule of a user.

For example, the processing section 26 checks a plan of the user X by referring to the schedule of the user X, and determines whether or not the user X can perform inspection within the changed inspection period (a week). The processing section 26 acquires information indicating the time required for inspection from another apparatus or the like, and determines whether or not the user X can secure the time required for the inspection. The information indicating the time required for inspection may be stored in the memory unit 24 of the server 12 in advance.

In a case where the user X may not perform inspection within the changed inspection period, that is, may not secure the time required for the inspection within the inspection period due to the schedule of the user X, the processing section 26 creates advice with the content that the change of the inspection period may not be accepted. Information indicating the advice is transmitted from the server 12 to the terminal apparatus 10, and is displayed on the screen 44 as a speech content of the automatic response AI. In the above-described way, advice corresponding to an attribute (for example, a schedule) of the user X is presented to the user X.

For example, as illustrated in FIG. 10, the information indicating the advice is displayed on the screen 44 as a speech content 68 of the automatic response AI. As described above, the speech content 68 includes information (information indicating a disadvantage) indicating that the inspection period is reduced from a month to a week. The speech content 68 includes information indicating that the user X hardly performs inspection within a week due to the schedule of the user X, and thus may not accept the change of the inspection period.

The processing section 26 may create an amendment to content and corresponding to an attribute of the user X. For example, the processing section 26 checks a schedule of the user X as an attribute of the user X, calculates a period in which the user X can perform inspection, and creates an amendment to the material transaction contract including information indicating the inspection period. In a case where the user X can perform the inspection within the inspection period of two weeks due to the schedule of the user X, the processing section 26 creates a file of a material transaction contract in which "two weeks" is written as the inspection period, as an amendment to the material transaction contract. A file of the amendment to the material transaction contract is transmitted from the server 12 to the terminal apparatus 10. For example, information indicating that the amendment to the material transaction contract has been created is displayed on the screen 44 as a speech content of the automatic response AI. An image associated with the file of the amendment is displayed on the screen 44. In a case where the user X designates the image, and gives a display instruction for the file, the control unit 20 displays the amendment to the material transaction contract on the display of the UI section 16. In the above-described way, an amendment corresponding to an attribute (for example, a schedule) of the user X is presented to the user X.

The processing section 26 may create advice with the content that the user X can complete inspection within the inspection period of two weeks. Information indicating the advice is transmitted from the server 12 to the terminal apparatus 10, and is displayed on the screen 44 as a speech content of the automatic response AI. In the above-described way, advice corresponding to an attribute (for example, a schedule) of the user X is presented to the user X.

The processing section 26 may create advice or an amendment corresponding to a division or a department (an example of an attribute of the user X) to which the user X belongs. Information indicating the division or the department to which the user X belongs is included in user attribute information correlated with the user X, and thus the processing section 26 specifies the division or the department to which the user X belongs by referring to the user attribute information. For example, in a case where content is a contract, a focused portion or a noticed portion for the user X may differ in a case where the user X belongs to a legal division and in a case where the user X belongs to a technical division (for example, a manufacturing division or a research and development division). For example, in a case where the user X belongs to the legal division, it is considered to particularly carefully check a portion which is likely to be problematic due to legal interpretation. On the other hand, in a case where the user X belongs to the technical division, it is considered to particularly carefully check a portion in which technical contents are written. Therefore, the processing section 26 changes a content of advice depending on a division or a department to which the user X belongs. For example, in a case where the user X belongs to the technical division, the processing section 26 detects a changed portion in a technical content, and creates advice for sending a notification of the changed portion. In a case where the user X belongs to the legal division, the processing section 26 detects a changed portion in parts other than the technical content, and creates advice for sending a notification of the changed portion. In contract examination, there may be a case where coping differs depending on a division or a department to which a user performing the examination belongs. By perform the above-described process, coping corresponding to a division or a department to which a user belongs is possible.

The processing section 26 may create advice or an amendment corresponding to a company (for example, "XXX Corporation") to which the user X belongs. Information indicating the company to which the user X belongs is included in user attribute information correlated with the user X, and thus the processing section 26 creates advice or an amendment by using information regarding the company included in the user attribute information. Specifically, in a case where content is a patent license contract, and information indicating a patent portfolio of a company is included in information regarding the company to which the user X belongs, the processing section 26 compares the patent license contract with the patent portfolio, and determines whether the patent license contract is advantageous or disadvantageous to the company to which the user X belongs. For example, the processing section 26 refers to the patent portfolio so as to specify a technical field (a technical field of a strong point) at which the company to which the user X belongs is good and a technical field (a technical field of a weak point) at which the company to which the user X belongs is not good. Specifically, in a case where the number of patent rights of a software field is larger than the number of patent rights of other technical fields, the processing section 26 identifies the software field as a technical field at which the company is good. In this case, for example, in a case where a clause of a right non-exercise for a patent right of the software field is provided in the patent license contract, the processing section 26 determines that the patent license contract is disadvantageous to the company. On the other hand, in a case where a clause of a right non-exercise for patent rights of other technical fields is provided in the patent license contract, the processing section 26 determines that the patent license contract is advantageous to the company. Of course, the determination example is only an example, and the processing section 26 may determine an advantage or a disadvantage on the basis of a combination of plural clauses. The same process as described above may be applied to contracts other than the patent license contract. Coping corresponding to a company to which a user belongs is possible by performing the above-described process.

As illustrated in FIGS. 8 and 10, time (for example, a time point or the date and time) at which each speech content is transmitted may be displayed on the screen 44. For example, text indicating the date and time (for example, today's date, December 27) is displayed on the screen 44. The speech contents displayed under the display position of the text indicating the date are speech contents transmitted after the date, and speech contents displayed over the display position are speech contents transmitted on dates before the date. Information indicating a time point may be displayed near each speech content. Of course, information indicating a time point or the date and time may not be displayed.

A read speech content and an unread speech content may be managed. Here, a description will be made of a read message and an unread message. The read message is a speech content which is read by a person (conversation partner) other than a sender of the speech content, and the unread message is a speech content which is not read by a person other than the sender. For example, in a case where a user transmits a speech content, and then the automatic response AI starts to analyze the speech content, the control unit 20 determines that the speech content of the user has been read by the automatic response AI. In a case where the automatic response AI emits a speech content, the speech content is displayed on the screen 44, and the user designates the speech content on the screen 44, designates the speech content and displays the speech content in a separate window (separate screen), or gives an instruction for a read speech content, the control unit 20 determines that the speech content of the automatic response AI has been read by the user. As another example, in a case where a confirmation message indicating that the automatic response AI makes a speech is displayed on the display, and the user gives a display instruction for the speech content, or the speech content is actually displayed on the screen 44, the control unit 20 may determine that the speech content of the automatic response AI has been read by the user.

In a case where it is determined that the speech content has been read by the conversation partner, the control unit 20 displays read information (text or an image) indicating that the speech content has been read by the conversation partner on the screen 44 in association with the speech content. For example, information such as text "read" is displayed as the read information in association with each speech content. A speech content correlated with the read information corresponds to a read message, and a message not associated with the read information corresponds to an unread message. The control unit 20 may display unread information indicating that a speech content is not read by the conversation partner on the screen 44 in association with an unread message. Read information may be displayed to be associated with a read message, and unread information may also be displayed to be associated with an unread message, and either information may be displayed.

In the examples illustrated in FIGS. 8 and 10, the read information is displayed to be associated with the speech content as text, but methods other than the method using text may be used as a method of expressing a read message. For example, the control unit 20 may cause expression aspects of a read message and an unread message to be different from each other. Specifically, the control unit 20 may express text included in an unread message by using a specific font, may express the text in a specific color, may express the text in bold, may decorate a display region of the unread message, and may display the unread message in a highlight manner. In the above-described way, a read message and an unread message are displayed to be differentiated from each other. Of course, the control unit 20 may apply the above-described process to a read message, and may not apply the above-described process to an unread message. The control unit 20 may display read information or unread information, and may also perform the above-described process.

Read information or unread information for a speech content of the user may be displayed on the screen 44, and read information or unread information for a speech content of the automatic response AI may also be displayed on the screen 44, and read information or unread information for a speech content of either the user or the automatic response AI may be displayed on the screen 44. Read information or unread information may not be displayed.

Figure 11:
FIG. 11 is a diagram illustrating an account book.

Hereinafter, a description will be made of a process performed on an account book other than a material transaction contract as content. FIG. 11 illustrates an account book 70. In the account book 70, a field into which an item is entered, a field into which an amount of money for the item is entered, and a field into which the date on which the amount of money is paid is entered are correlated with each other. A file of the account book 70 is registered in the registration table illustrated in FIG. 4 as registered content, and is stored in the memory unit 24 of the server 12. The file of the account book 70 is correlated with file attribute information of the account book 70.

Hereinafter, a description will be made of a procedure for comparing content with registered content, and a process performed by the processing section 26.

Figure 12:
FIG. 12 is a diagram illustrating an account book.

In a case where a new expenditure occurs, the user enters an item, an amount of money, and the date for the new expenditure in the account book 70 configured with a physical paper sheet or the file of the account book 70 as data. FIG. 12 illustrates an account book 72 in which a new expenditure is entered. For example, an item C (an amount of money: 3,000 yen, and the date: Dec. 3, 2017) is added to the account book 70, and thus the account book 72 is created.

In a case where a new expenditure is entered in the file of the account book 70, a file of the account book 72 is used as a comparison process target.

In a case where the account book 72 is configured with a physical paper sheet, the user scans the account book 72 with the scanner. The user may image the account book 72 with the camera. Through the scanning or imaging, the file (for example, an image file, a document file, or a table file) of the account book 72 is generated. The file generated in the above-described way is used as a comparison process target.

As described with reference to FIG. 8, the user sends the file of the account book 72 to the automatic response AI on the screen 44. Consequently, the file of the account book 72 is transmitted from the terminal apparatus 10 to the server 12 as content compared with registered content.

The processing section 26 of the server 12 retrieves registered content (registered file) related to the file of the account book 72 in the registration table stored in the memory unit 24. The processing section 26 may compare content attribute information correlated with the file of the account book 72 with content attribute information correlated with each piece of registered content, so as to retrieve the registered content related to the file of the account book 72. The processing section 26 may apply a language analysis process to the file of the account book 72 so as to specify a content of the account book 72, and may retrieve registered content having a content related to the content. For example, the file of the account book 70 is specified as registered content related to the file of the account book 72, and is used as a comparison target file for the file of the account book 72.

In a case where the registered account book 70 is specified as a comparison target in the above-described way, the processing section 26 compares the file of the registered account book 70 with the file of the account book 72, and performs processes corresponding to a comparison result and the account book 70. As illustrated in FIG. 4, a process content for the account book is "(1) a process of updating the file of the account book by overwriting a content of the account book". In this case, the processing section 26 adds a difference (a content of the item C) between the account book 70 and the account book 72 to the file of the registered account book 70 so as to overwrite the content of the account book 70 and to update exhaust account book 70. Consequently, the file of the account book (a file having the same content as that of the account book 72) in which the items A, B, and C are entered is registered in the registration table as registered content, and is stored in the memory unit 24 of the server 12.

A description will be made of a process performed on an account book and a receipt as still further content. FIG. 13 illustrates the account book 70 and a receipt 74. The account book 70 has the same content as that of the account book 70 illustrated in FIG. 11. Items (an amount of money and the date) to be added to the account book 70 are written on the receipt 74. It is assumed that the file of the account book 70 is registered in the registration table as registered content, and is stored in the memory unit 24 of the server 12.

Hereinafter, a description will be made of a procedure for comparing content with registered content, and a process performed by the processing section 26.

In a case where the account book 70 is configured with a physical paper sheet, the user scans the account book 70 with the scanner. The user may image the account book 70 with the camera. Through the scanning or imaging, the file (for example, an image file, a document file, or a table file) of the account book 70 is generated. Similarly, in a case where the receipt 74 is configured with a physical paper sheet, a file of the receipt 74 is generated through scanning or imaging. The file generated in the above-described way is used as a comparison process target. In a case where a file of the account book 70 has already been generated, the file is used as a comparison process target. Similarly, in a case where a file of the receipt 74 has already been generated, the file is used as a comparison process target.

As described with reference to FIG. 8, the user sends the file of the account book 70 and the file of the receipt 74 to the automatic response AI on the screen 44. Consequently, the file of the account book 70 and the file of the receipt 74 are transmitted from the terminal apparatus 10 to the server 12 as content compared with registered content.

The processing section 26 of the server 12 retrieves registered content (registered file) related to the account book 70 and the receipt 74 in the registration table stored in the memory unit 24. For example, the processing section 26 compares the file of the account book 70 sent from the terminal apparatus 10 with each piece of registered content, so as to specify registered content related to the account book 70 and the receipt 74. Since the file of the account book 70 is registered in the registration table as registered content, the processing section 26 specifies the file of the account book 70 as registered content related to the account book 70 and the receipt 74 sent from the terminal apparatus 10.

As mentioned above, in a case where the registered content related to the account book 70 and the receipt 74 sent from the terminal apparatus 10 is specified, the processing section 26 performs processes corresponding to the account book and the receipt. As illustrated in FIG. 4, process contents for the account book and the receipt are "(1) a process of adding a content of the receipt to the file of the account book, and sending a notification of a result of integrating fees" and "(2) a process of adding the content of the receipt to the file of the account book, and updating a database thereof". The processing section 26 performs the process (1) or the process (2), for example, in response to the user's instruction. Of course, the processing section 26 may perform both of the process (1) and the process (2).

As the process (1), for example, the processing section 26 adds the content (the content of the item C) of the receipt 74 to the file of the registered account book 70, and notifies the user of a result of integrating fees. Information indicating the result is transmitted from the server 12 to the terminal apparatus 10, and is displayed on the display of the UI section 16. As the process (2), the processing section 26 may add the content of the receipt 74 to the file of the registered account book 70 so as to update a database (for example, the file of the account book 70).

As mentioned above, according to the present exemplary embodiment, in a case where a user sends content to automatic response AI, registered content related to the content is specified, the content is compared with the registered content, and processes (for example, a difference extraction process, an advice presenting process, an amendment presenting process, and a process of updating registered content) corresponding to a comparison result and the content are performed. Since the processes are performed through a conversation with the automatic response AI, the user can give an execution instruction through an easy operation compared with a case where the user gives an execution instruction for the processes without a conversation. A process corresponding to an attribute (for example, a schedule of the user, or a company or a department to which the user belongs) of the user is performed, and thus advice or an amendment suitable for the user is presented.

Other Exemplary Embodiments

Hereinafter, other exemplary embodiments will be described. The processing section 26 may perform a remind function. For example, in a case where an execution time limit for a procedure is described in content, the processing section 26 may send a notification of information (hereinafter, "remind information") for prompting the procedure to be executed according to a relationship between the execution time limit and the current date and time (which may be the date). The controller unit 28 controls execution of the remind function of the processing section 26. Content to which the remind function is applied may be registered content described in the exemplary embodiment, and content which is not registered. Hereinafter, the remind function will be described in detail.

Figure 14:
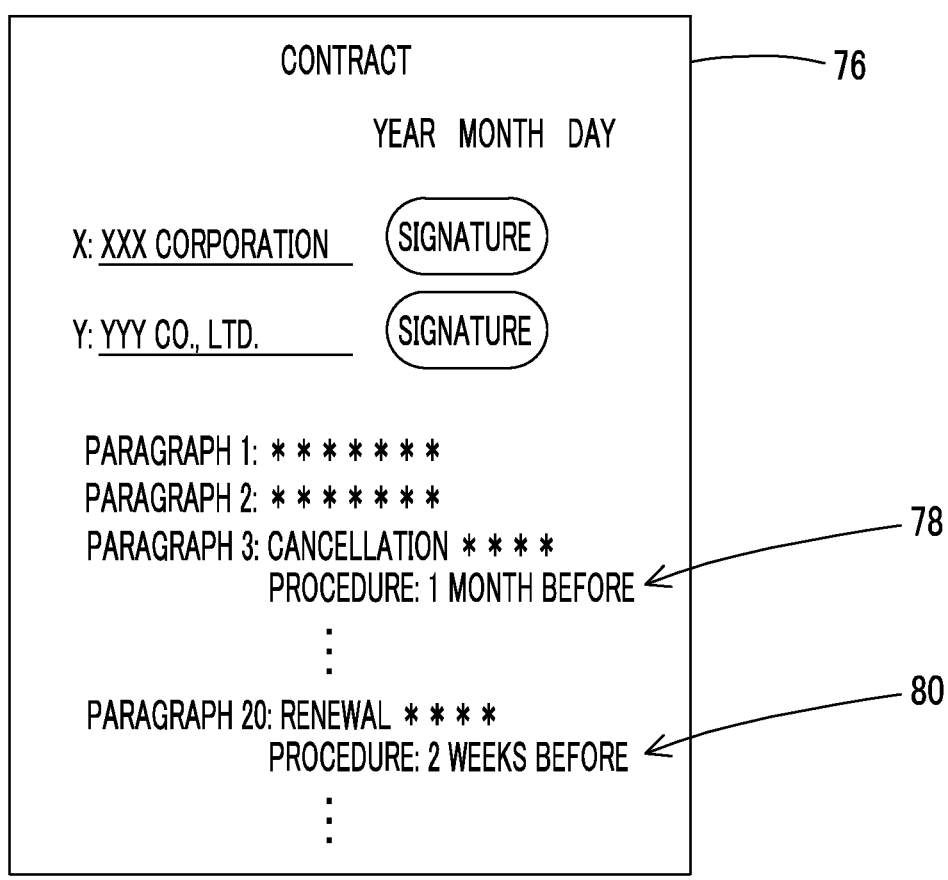
FIG. 14 is a diagram illustrating a contract.

FIG. 14 illustrates a file of a contract 76 as an example of content. A date field, a parties field, contract clauses, and the like are written on the contract 76 in the same manner as in the contracts illustrated in FIGS. 5 to 7. An execution time limit for a procedure (an action, a process, work, or the like) such as renewal or cancellation (withdrawal) of the contract is written on the contract 76. For example, in a real estate lease contract, an article loan for use contract, or a communication apparatus use contract (for example, a contract for using a mobile phone or a smart phone), there is a case where a renewal time limit or a cancellation time limit for the contract is defined. In other contracts, for example, in a continuous contract, there is a case where a renewal time limit or a cancellation time limit for the contract is defined.

In the example illustrated in FIG. 14, as indicated by an arrow 78, a contract cancellation time limit (that is, an execution time limit for a procedure such as cancellation) is written on the contract 76. As an example, a month before a contract termination time is defined as a cancellation time limit. For example, in a case where a contract termination time is Mar. 13, 2018, a cancellation time limit is Feb. 13, 2018. As indicated by an arrow 80, a contract renewal time limit (that is, an execution time limit for a procedure such as renewal) is written on the contract 76. As an example, two weeks before a contract termination time is defined as a renewal time limit.

The processing section 26 applies a language analysis process to the file of the contract 76, so as to extract an execution time limit for each procedure from the contract 76. In the example illustrated in FIG. 14, a contract cancellation time limit and a contract renewal time limit are extracted. The processing section 26 analyzes written contents of the contract 76 so as to extract a user performing a procedure such as cancellation or renewal.

The processing section 26 executes the remind function at a predefined time before the execution time limit. In other words, the processing section 26 transmits remind information to the terminal apparatus 10 associated with the user performing a procedure such as cancellation or renewal. In a case where the contract 76 is managed by a group including plural users, the processing section 26 may transmit the remind information to the terminal apparatus 10 associated with each of the plural users included in the group. For example, in a case where content is managed in the group unit, the remind function is executed in the group unit. The processing section 26 may transmit the remind information to the terminal apparatus 10 associated with a user having predefined authority (for example, management authority, cancellation authority, or renewal authority) among the plural users. Address information of the terminal apparatus 10 associated with each user is stored in advance in the memory unit 24 of the server 12, and the processing section 26 transmits the remind information to each terminal apparatus 10 by using the address information of each terminal apparatus 10. The control unit 20 of the terminal apparatus 10 having received the remind information displays the remind information on the UI section 16. For example, the remind information is displayed on a user interface in an interactive form. Of course, the remind information may be displayed on a user interface with forms other than the interactive form, and a notification of the remind information may be performed in voices. As an example, a group includes users A and B, and the processing section 26 transmits the remind information to the terminal apparatus 10 associated with each of the users A and B. The remind information is displayed on each terminal apparatus 10 of the users A and B.

Figure 15:
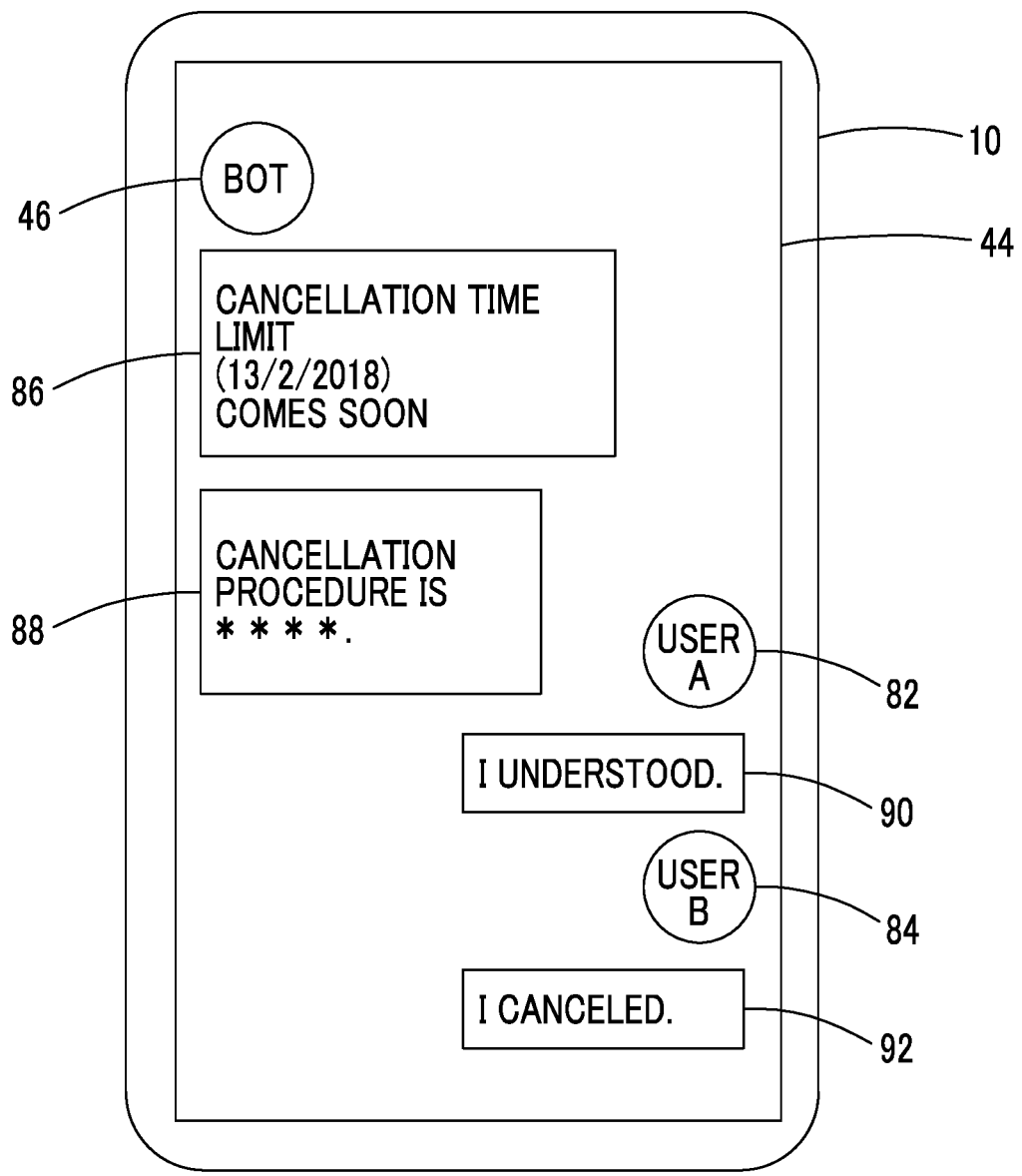
FIG. 15 is a diagram illustrating a screen.

FIG. 15 illustrates a display example of remind information. The screen 44 illustrated in FIG. 15 is a user interface in an interactive form in the same manner as in the above-described exemplary embodiment. Herein, it is assumed that the users A and B participate in conversations, and thus a conversation group is formed. The users A and B and the automatic response AI can make conversations (chatting) with each other via the screen 44. Of course, conversations can be made by using voice information. The screen 44 is displayed on the UI section 16 of the terminal apparatus 10 of each of the users A and B. The image 46 associated with the automatic response AI, an image 82 associated with the user A, and an image 84 associated with the user B are displayed on the screen 44.

For example, in a case where a cancellation time limit is Feb. 13, 2018, the processing section 26 executes the remind function at a predefined time before the cancellation time limit (for example, a week before). The predefined time may be changed by the user or a manager. Since the remind function is executed, remind information is transmitted from the server 12 to the terminal apparatus 10 a week before the cancellation time limit. The control unit 20 of the terminal apparatus 10 displays the remind information on the UI section 16. In the example illustrated in FIG. 15, the control unit 20 displays a message (remind information) indicating that the cancellation time limit comes soon on the screen 44 as a speech content 86 of the automatic response AI.

The processing section 26 specifies a specific content of a procedure to be performed, and may notify the terminal apparatus 10 of the content. For example, in a case where a specific content of a cancellation procedure (for example, a content such as a telephone call being made to a contract partner, cancellation being sent via a chat, an electronic mail being transmitted, or withdrawal being sent by a document) is written on the contract 76, the processing section 26 extracts the content, and transmits information indicating the content to the terminal apparatus 10.

The control unit 20 of the terminal apparatus 10 displays information indicating the specific content of the procedure on the UI section 16. For example, the control unit 20 displays a message indicating the content of the cancellation procedure on the screen 44 as a speech content 88 of the automatic response AI.

The speech content 86 as the remind information and the speech content 88 indicating the content of the procedure may be displayed on the screen 44 as an identical speech content, and may be displayed as different speech contents. The speech contents 86 and 88 may be simultaneously displayed on the screen 44, and may be displayed at different timings. For example, the speech content 86 may be displayed first, and the speech content 88 may be displayed next.

With respect to the speech content of the automatic response AI, in the example illustrated in FIG. 15, the user A makes a speech with the content that "I understood", and the content is displayed on the screen 44 as a speech content 90 of the user A.

The user B makes a speech with the content that "cancel", and the content is displayed on the screen 44 as a speech content 92 of the user B.

In the same manner as in a cancellation time limit, in a contract renewal time limit, a notification of remind information is performed at a predefined time before the renewal time limit (for example, two weeks before).

As mentioned above, in a case where a procedure execution time limit (in the above example, a cancellation time limit or a renewal time limit) is described in content, a notification of remind information is performed at a predefined time before the execution time limit. The remind information is displayed on, for example, a user interface in an interactive form. In the above-described way, a user can recognize a process to be executed and an execution time limit for the procedure before the execution time limit elapses.

The processing section 26 may transmit remind information only once, and may transmit the remind information plural times. In a case where the remind information is transmitted plural times, the processing section 26 may change a content of the remind information stepwise. For example, the processing section 26 transmits remind information indicating higher urgency as an execution time limit comes sooner. In the above-described way, a user receiving the remind information can recognize that urgency becomes higher as the execution time limit comes sooner. The processing section 26 may shorten a time interval of transmission of each piece of remind information as the execution time limit comes sooner. For example, with respect to remind information related to cancellation, the processing section 26 transmits remind information a month, two weeks, a week, five days, three days, and a day before a cancellation time limit. In the above-described way, it is possible to more strongly prompt the user to perform a procedure.

The user may instruct the remind function to be stopped. For example, in a case where initial remind information is displayed on the screen 44, and then the user makes a speech with the content that reminding is not necessary, the processing section 26 may stop transmission of subsequent remind information.

In the above example, the user B gives an instruction for contract cancellation with the speech content 92. In this case, the automatic response AI applies a language analysis process to the speech content 92, and thus recognizes that the cancellation instruction is given by the user B. The analysis process may be performed by the processing section 26.

The remind information may be transmitted to the terminal apparatus 10 associated with a user having authority to perform a procedure. For example, in a case where the user A does not have cancellation authority, and the user B has cancellation authority, the remind information may be transmitted to the terminal apparatus 10 associated with the user B so as to be displayed.

In a case where a user having authority to perform a procedure instructs the procedure to be performed, that is, the user makes a speech indicating execution of the procedure, the automatic response AI may recognize that an instruction for execution of the procedure is given. For example, in a case where the user A does not have cancellation authority, the user B has cancellation authority, and the user B makes a speech indicating cancellation, the automatic response AI recognizes that a cancellation instruction is given by the user having the cancellation authority. On the other hand, in a case where the user A makes a speech indicating cancellation, the automatic response AI recognizes that a cancellation instruction is given by the user not having the cancellation authority.

In a case where cancellation is recognized through chatting, the automatic response AI may transmit information indicating an intention of cancellation to the terminal apparatus 10 associated with a contract partner (for example, the user C). For example, address information of the terminal apparatus 10 associated with the user C is stored in the memory unit 18 of the terminal apparatus 10 of each of the users A and B, and the automatic response AI transmits information indicating a cancellation intention to the terminal apparatus 10 associated with the user C by using the address information. For example, it is assumed that, in a real estate lease contract, the user C is a lessor, and the users A and B are lessees. In this case, the users A and B who are lessees send a cancellation intention to the user C who is a lessor through chatting, and thus the lease contract is canceled.

In a case where a user (for example, the user B) having cancellation authority gives a cancellation instruction, the automatic response AI may transmit information indicating a cancellation intention to the terminal apparatus 10 associated with the user C. In a case where a user (for example, the user A) not having cancellation authority gives a cancellation instruction, the automatic response AI does not transmit information indicating a cancellation intention to the terminal apparatus 10 associated with the user C.

Figure 16:
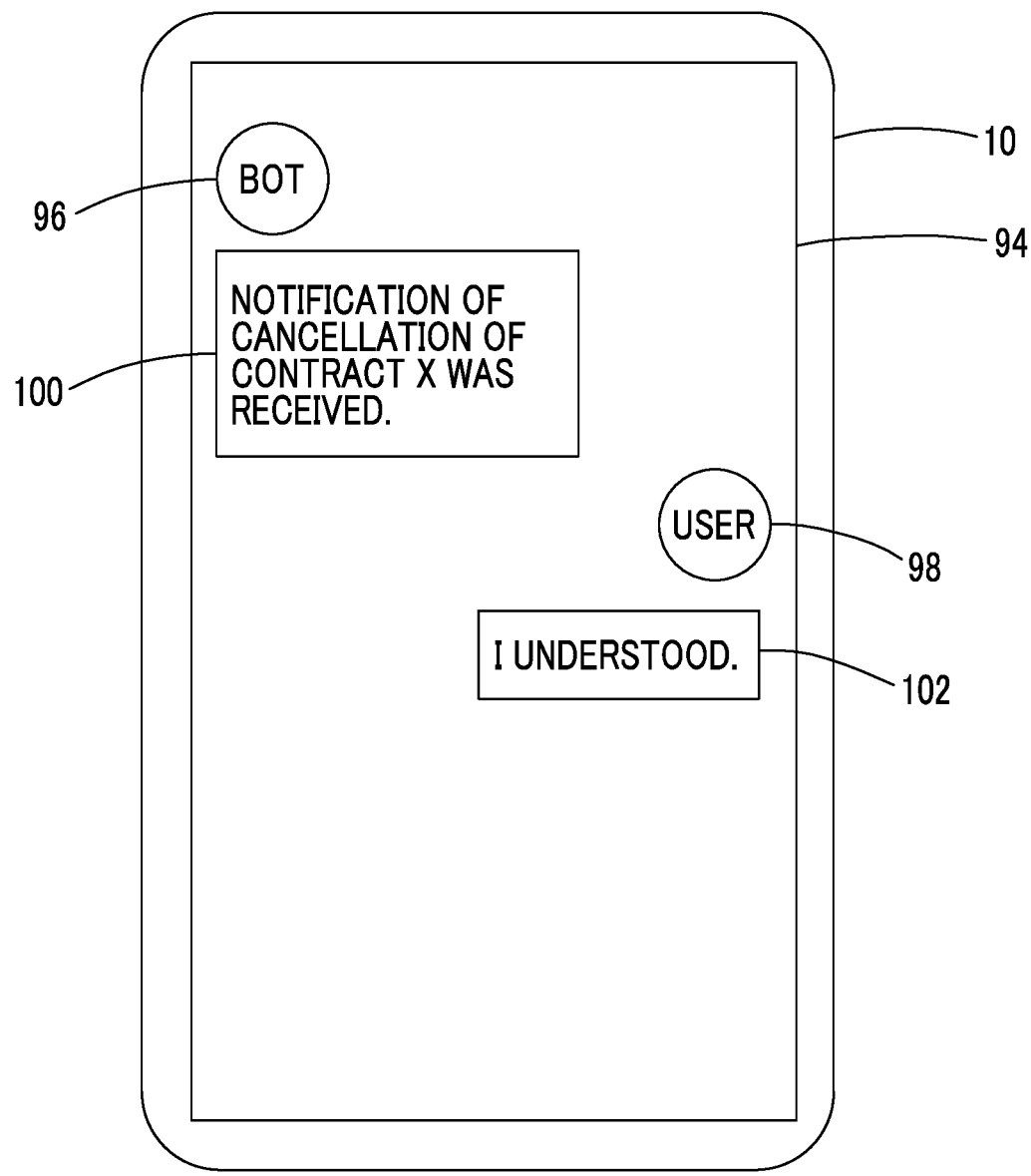
FIG. 16 is a diagram illustrating a screen.

The control unit 20 of the terminal apparatus 10 associated with the user C displays the information indicating the cancellation intention transmitted from the terminal apparatus 10 associated with the contract partner, on the UI section 16. FIG. 16 illustrates a display example thereof. The control unit 20 of the terminal apparatus 10 associated with the user C displays a screen 94 which is a user interface in an interactive form on the UI section 16. An image 96 associated with the automatic response AI used by the user C and image 98 associated with the user C are displayed on the screen 94.

In a case where information indicating a cancellation intention is transmitted from the terminal apparatus 10 associated with the user B to the terminal apparatus 10 associated with the user C, the control unit 20 of the terminal apparatus 10 associated with the user C displays the information indicating the cancellation intention on the UI section 16. For example, the control unit 20 displays the information indicating the cancellation intention on the screen 94 as a speech content 100 of the automatic response AI. Consequently, cancellation intentions of the users A and B can be sent to the user C.

In a case where the user C makes a speech with the content that "I understood", the content is displayed on the screen 94 as a speech content 102 of the user C. Information indicating the speech content 102 may be transmitted to the terminal apparatus 10 associated with each of the users A and B from the terminal apparatus 10 associated with the user B.

As mentioned above, a procedure (for example, cancellation or renewal) may be performed through chatting using a user interface in an interactive form. In this case, a user can perform a procedure according to an easy method.

In the above example, content (for example, the contract 76) is managed by plural users (for example, the users A and B), but the above-described remind function is also executed in a case where the content is managed by a single user (for example, the user A). For example, in a case where the contract 76 is managed by the user A, a user interface in an interactive form is displayed on the UI section 16 of the terminal apparatus 10 associated with the user A, and remind information is displayed on the user interface.

In a case where plural users (for example, the users A and B) participate in a user interface in an interactive form, a comparison result or a process in the above-described exemplary embodiment may be shared between the plural users. For example, the speech content 56 (a speech content indicating a result of a process of extracting a changed portion) illustrated in FIG. 8 may be shared between the users A and B as a comparison result or a process result. In this case, the speech content 56 is displayed on the user interface in an interactive form in which the users A and B participate. The speech content 68 (a speech content indicating a comparison result and a process result) illustrated in FIG. 10 is displayed on a user interface in an interactive form in which the users A and B participate.

Figure 17:
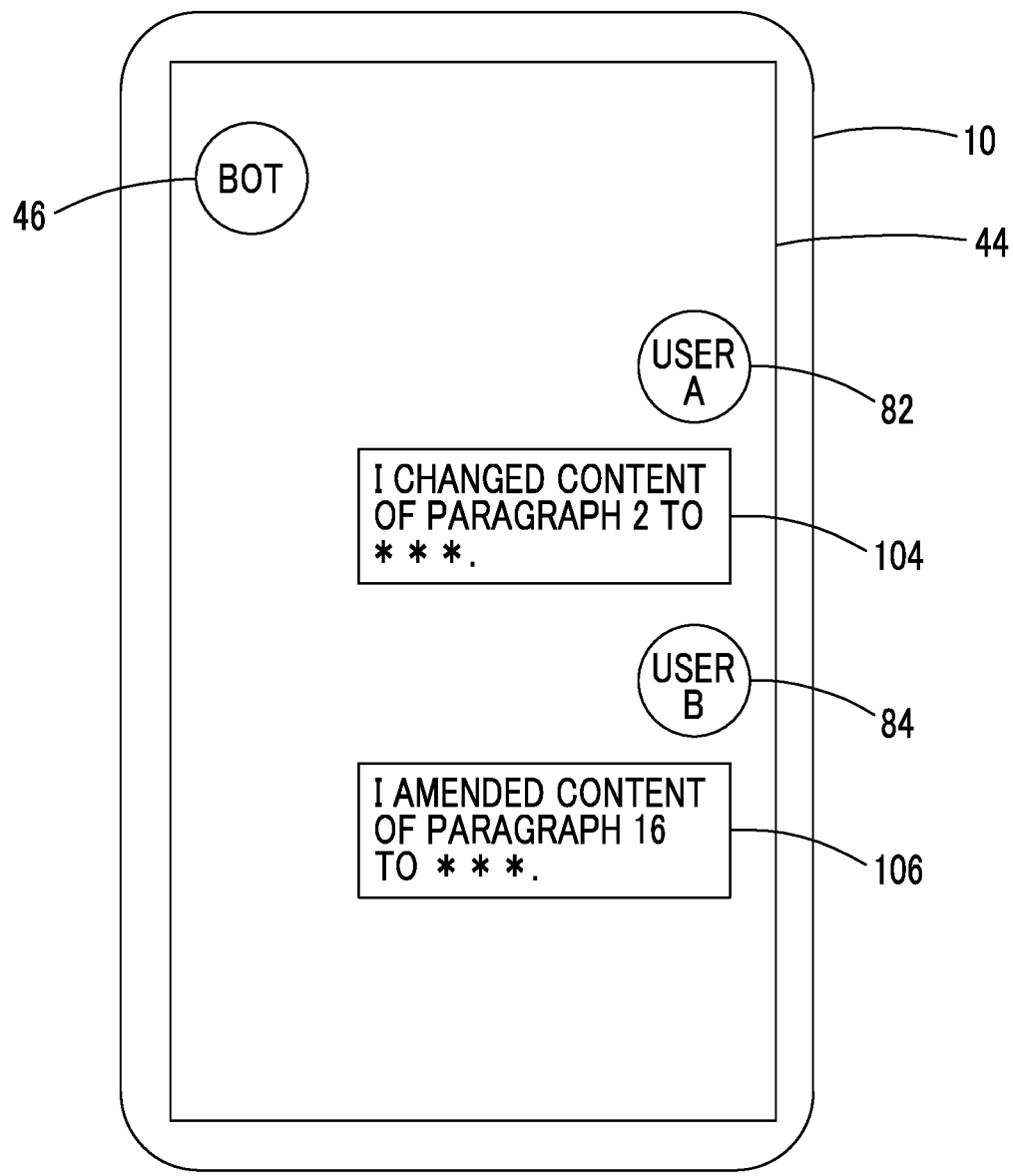
FIG. 17 is a diagram illustrating a screen.

Plural users may create or edit content together. FIG. 17 illustrates an example of editing work. For example, it is assumed that the users A and B participate in conversations (chats). For example, a speech content 104 is displayed on the screen 44 as a speech content of the user A, and a speech content 106 is displayed on the screen 44 as a speech content of the user B. The speech content 104 is a content indicating that a part of the contract 76 is instructed to be changed. The automatic response AI analyzes the speech content 104 so as to recognize the changing instruction, and changes a part of the contract 76 in response to the changing instruction. The speech content 106 is a content indicating that a part of the contract 76 is instructed to be amended. The automatic response AI analyzes the speech content 106 so as to recognize the amending instruction, and amends a part of the contract 76 in response to the amending instruction.

Each of the terminal apparatus 10 and the server 12 is realized through cooperation between hardware and software as an example. Specifically, each of the terminal apparatus 10 and the server 12 includes one or plural processors such as CPUs (not illustrated). The one or plural processors read a program stored in a storage device (not illustrated) and execute the program, and thus a function of each unit of each of the terminal apparatus 10 and the server 12 is realized. The program is stored in a storage device via a recording medium such as a CD or a DVD, or a communication path such as a network. As another example, each unit of each of the terminal apparatus 10 and the server 12 may be realized by a hardware resource such as a processor, an electronic circuit, or an application specific integrated circuit (ASIC). A device such as a memory may be used for the realization. As still another example, each unit of each of the terminal apparatus 10 and the server 12 may be realized by a digital signal processor (DSP) or a field programmable gate array (FPGA).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a controller and a memory, wherein the controller comprises a conversation partner and configured to:
retrieve content of a contract from the conversation partner according to a dialogue between a user at a user terminal and the conversation partner;
retrieve registered content of the contract stored in a registration table in the memory by using content attribute information correlated with the registered content of the contract as a search key;
generate a comparison result between the content of the contract and the registered content of the contract;
execute processes according to the comparison result between the content of the contract and the registered content of the contract, and content of process in the registration table; and
create a response to be transmitted to the user terminal according to the executed processes.

2. The information processing apparatus according to claim 1,
wherein the registered content of the contract is content which is registered earlier than the content of the contract.

3. The information processing apparatus according to claim 2,
wherein the registered content of the contract is content which is created by using a predefined template and is registered, and
wherein the content of the contract is content which is created on a basis of the registered.

4. The information processing apparatus according to claim 1,
wherein the controller changes the processes according to an attribute of a user.

5. The information processing apparatus according to claim 2,
wherein the controller changes the processes according to an attribute of a user.

6. The information processing apparatus according to claim 3,
wherein the controller changes the processes according to an attribute of a user.

7. The information processing apparatus according to claim 1,
wherein the controller changes the processes according to the type of content.

8. The information processing apparatus according to claim 2,
wherein the controller changes the processes according to the type of content.

9. The information processing apparatus according to claim 3,
wherein the controller changes the processes according to the type of content.

10. The information processing apparatus according to claim 4,
wherein the controller changes the processes according to the type of content.

11. The information processing apparatus according to claim 5,
wherein the controller changes the processes according to the type of content.

12. The information processing apparatus according to claim 6,
wherein the controller changes the processes according to the type of content.

13. The information processing apparatus according to claim 1,
wherein the processes include a process of presenting an amendment of the content and corresponding to an attribute of a user.

14. The information processing apparatus according to claim 1,
wherein the processes include a process of giving advice corresponding to an attribute of a user.

15. The information processing apparatus according to claim 1,
wherein the processes include a process of extracting a difference between the registered content of the contract and the content of the contract.

16. The information processing apparatus according to claim 1,
wherein the controller further controls a notification of information for prompting execution of a procedure at a predefined time before an execution time limit for the procedure described in the content of the contract.

17. The information processing apparatus according to claim 1,
wherein, in a case where the content of the contract is sent to a response assistant which gives a response to an inquiry from a user, the controller controls execution of the processes corresponding to the comparison result between the content of the contract sent to the response assistant and the registered content of the contract, and the content of the contract.

18. The information processing apparatus according to claim 1,
wherein a notification of the content performed by a user is performed on a user interface in an interactive form.

19. The information processing apparatus according to claim 17,
wherein, in a case where a plurality of users participate in a user interface in an interactive form, the comparison result and the processes are shared among the plurality of users.

20. A non-transitory computer readable medium storing a program causing a computer to function as:
a controller, wherein the controller comprises a conversation partner and configured to:
retrieve content of a contract from the conversation partner according to a dialogue between a user at a user terminal and the conversation partner;
retrieve registered content of the contract stored in a registration table in a memory by using content attribute information correlated with the registered content of the contract as a search key;
generate a comparison result between the content of the contract and the registered content of the contract;
execute processes according to the comparison result between the content of the contract and the registered content of the contract, and content of process in the registration table; and
create a response to be transmitted to the user terminal according to the executed processes.

* * * * *